(12) United States Patent
Takai

(10) Patent No.: US 6,272,246 B1
(45) Date of Patent: Aug. 7, 2001

(54) POSITIONING DEVICE

(75) Inventor: Kensuke Takai, Kyoto (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 09/003,592

(22) Filed: Jan. 6, 1998

(30) Foreign Application Priority Data

Feb. 5, 1997 (JP) .................................................... 9-022960

(51) Int. Cl.$^7$ ...................................................... G06K 9/62
(52) U.S. Cl. ........................... 382/209; 382/217; 358/458
(58) Field of Search ........................... 382/209, 217–219, 382/274, 227, 224; 358/520–523, 455–458

(56) References Cited

U.S. PATENT DOCUMENTS

| | | | |
|---|---|---|---|
| 5,065,440 | * 11/1991 | Yoshida et al. | 382/219 |
| 5,136,661 | * 8/1992 | Kobayahi et al. | 382/288 |
| 5,521,984 | * 5/1996 | Denenberg et al. | 382/209 |
| 5,933,546 | * 8/1999 | Stone | 382/278 |
| 5,960,112 | * 9/1999 | Lin et al. | 382/218 |
| 5,982,945 | * 11/1999 | Neff et al. | 382/271 |
| 6,023,530 | * 2/2000 | Wilson | 382/219 |

FOREIGN PATENT DOCUMENTS 4-157577 5/1992 (JP) .

* cited by examiner

*Primary Examiner*—Matthew C. Bella
*Assistant Examiner*—Gregory Desire

(57) ABSTRACT

In a positioning device, a maximum-value/minimum-value calculating section calculates the maximum value and minimum value of densities with respect to each of a target image and a reference image that has been preliminarily stored. Further, based upon the maximum values and minimum values of densities of the two images, a barrel-shifter gradation conversion section carries out bit shifts of the original images of the two images respectively so as to allow them to contain effective bits related to contrast, and gradation-converts the respective images so as to have numbers of density levels that are fewer than the original numbers of density levels thereof, thereby outputting the resulting images that have been gradation-converted. With this arrangement, even if the contrast of an original image is poor, it is possible to reduce the amount of calculations for finding the degree of similarity between the reference image and the target image without impairing the operation accuracy in finding the degree of similarity. Therefore, even if the contrast of an original image is poor, it is possible to carry out an effective rough search by using a rough search section. Moreover, since the degree of similarity is found with high precision with a minimum of the amount of calculations, the circuit scale can be minimized to the corresponding extent.

18 Claims, 14 Drawing Sheets

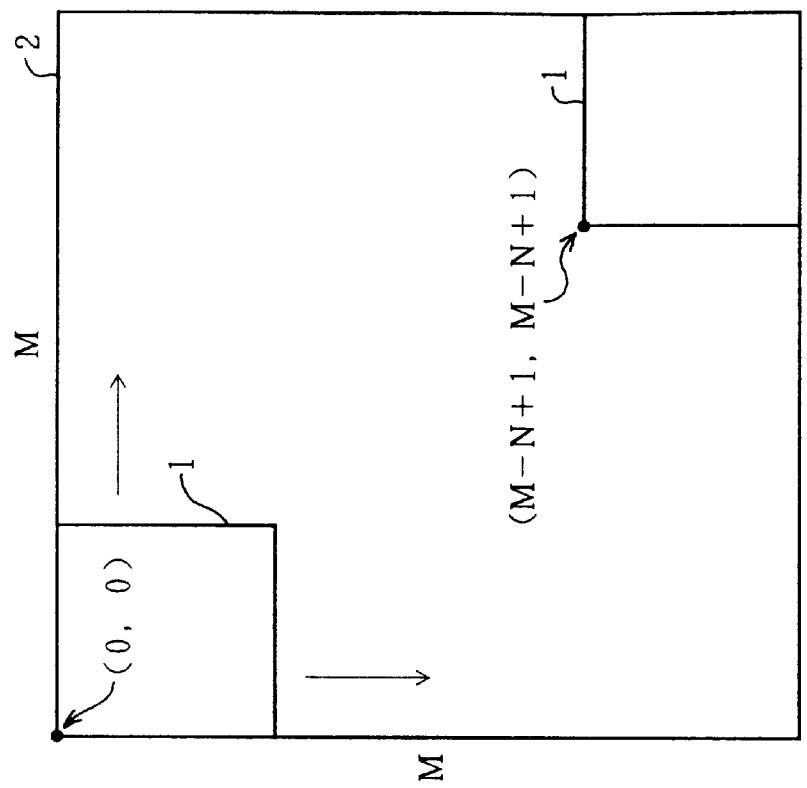
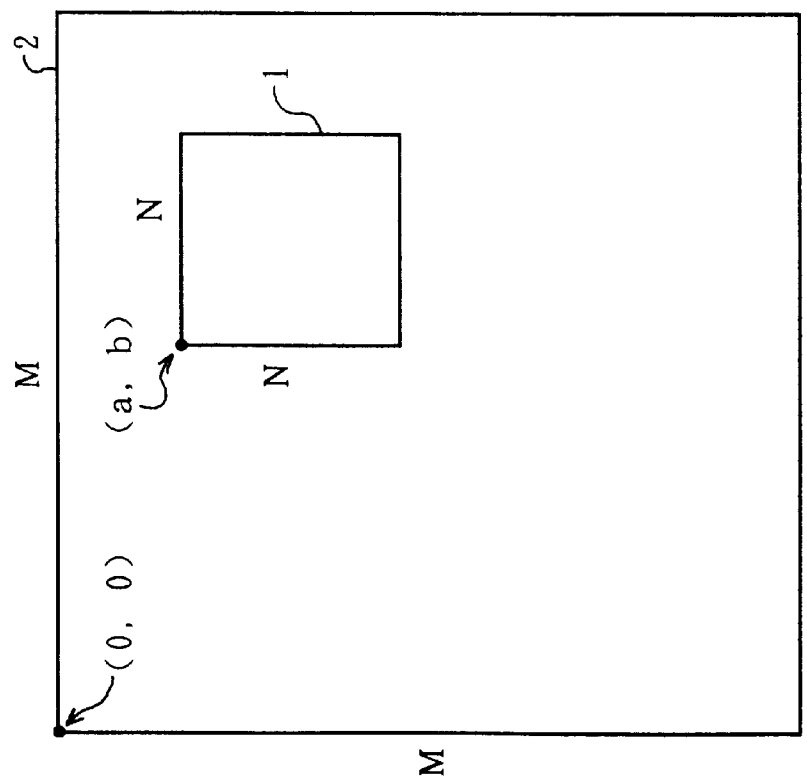
FIG. 4 (a)
FIG. 4 (b)

POSITIONING DEVICE

FIELD OF THE INVENTION

The present invention relates to a positioning device for carrying out a pattern-matching process.

BACKGROUND OF THE INVENTION

Conventionally, positioning of an object is carried out by a pattern-matching process using a template. In accordance with this pattern-matching process, a window is set in image data obtained by photographing the object, and the degree of coincidence or the degree of similarity between the image of the object within the window and a reference image that has been preliminarily registered is calculated. By carrying out these calculations as well as successively scanning the window within the image data, it is possible to find out the position at which the highest degree of coincidence or the highest degree of similarity is obtained, and the positioning is carried out based upon this position.

Correlation coefficients are used as one of the indicators for the degree of similarity. In this method, for example, a reference image with N×N pixels, preliminarily registered, is superposed on a search area (M−N+1)×(M−N+1) within the target image with M×M pixels that is larger than the reference image. Further, it is and shifted so as to find the position of the upper left corner of the reference image that makes the result of the following equation (1) maximum.

$$c(a, b) = \frac{\sum_{m=0}^{N-1}\sum_{n=0}^{N-1} \{I_{(a,b)}(m, n) - \bar{I}\}\{T(m, n) - \bar{T}\}}{\sqrt{(I\sigma_{a,b} \cdot T\sigma)}} \quad \text{where} \quad (1)$$

$$\bar{I} = \frac{1}{N^2}\sum_{m=0}^{N-1}\sum_{n=0}^{N-1} I_{(a,b)}(m, n)$$

$$\bar{T} = \frac{1}{N^2}\sum_{m=0}^{N-1}\sum_{n=0}^{N-1} T_{(a,b)}(m, n)$$

$$I\sigma_{a,b} = \frac{1}{N^2}\sum_{m=0}^{N-1}\sum_{n=0}^{N-1} \{I_{(a,b)}(m, n) - \bar{I}\}^2$$

$$T\sigma = \frac{1}{N^2}\sum_{m=0}^{N-1}\sum_{n=0}^{N-1} \{T(m, n) - \bar{T}\}^2$$

In the above equation (1), (a, b) indicates the upper right corner of the reference image within the target image, $I_{(a, b)}$ (m, n) indicates a partial image within the target image, and T(m, n) indicates the reference image.

However, since the above-mentioned equation (1) requires a large amount of calculations, the application of the equation results in a problem of requirement of large-scale hardware upon carrying out operations at high speeds. In general, in order to solve this problem, an approximate positioning, that is, a rough search, is carried out on an image with a reduced resolution so as to find out candidate points. Further, a more accurate positioning is carried out in the proximity of these candidate points.

Here, in one of the known positioning devices (for example, Japanese Laid-Open Patent Publication No. 157577/1992 (Tokukaihei 4-157577)), a gradation conversion, which converts the density bit numbers of the original images of the reference image and a target image into fewer density bit numbers, is carried out so as to reduce the amount of calculations required for the positioning. The degree of coincidence between the edge of the reference image and the edge of the target image is calculated by carrying out noise elimination and edge extraction.

In the above-mentioned positioning device, as disclosed in Japanese Laid-Open Patent Publication No. 157577/1992 (Tokukaihei 4-157577), however, upon carrying out the gradation conversion between the original images of the reference image and the target image so as to reduce the amount of calculations required for the positioning between the reference image and the target image, the gradation of the original image is merely compressed by eliminating lower bits by carrying out dividing operations, etc., regardless of the contrast of the image.

However, in the case of poor contrast in the original image, such as in the case of target images that are too dark or too bright, the image obtained after the gradation conversion tends to become an image with extremely few gradations. In such a case, the further the density bit number after the gradation conversion is reduced, the worse the operation accuracy in the degree of similarity on correlation coefficients, etc., Further, since effective bits related to contrast tend to be buried and become inconspicuous, it is difficult to carry out the rough search effectively.

SUMMARY OF THE INVENTION

The objective of the present invention is to provide a positioning device which, even if the contrast of an original image is poor, can reduce the amount of calculations for finding the degree of similarity between the reference image and the target image without impairing the operation accuracy in finding the degree of similarity, and consequently can carry out an effective rough search.

In order to achieve the above-mentioned objective, the positioning device of the present invention, which is a positioning device for carry out a positioning between a preliminarily registered reference image and a newly inputted target image, is provided with: a first calculating section for calculating the features of the target image; a first gradation conversion section which converts the gradation of the target image so as to produce a rough target image based upon the results of calculations in the first calculating section so that information related to contrast of the target image is maintained to a greater extent, and so that the number of density levels of the target image is reduced; a rough search section for finding the degree of similarity between a rough reference image whose gradation has been converted and the rough target image so as to find a maximum matching candidate point; and a precise search section for finding a maximum matching point between the reference image and the target image in the proximity of the maximum matching candidate point.

With the above-mentioned arrangement, the gradation converting operation in the first gradation conversion section is adjusted in accordance with the features of the target image that have been calculated by the first calculating section. As a result, even if it merely has low gradation as compared with the target image, the rough target image, produced by the first gradation conversion section, contains more information related to contrast of the target image as compared with the case in which the target image is always gradation-converted by the same gradation-converting operation, such as a case in which the gradation is simply compressed.

Consequently, even in the case when the target image has less density change (has poor contrast), such as in cases when the target image is dark as a whole and when it is bright as a whole, the rough search section can maintain proper operation accuracy in finding the degree of similarity. Therefore, as compared with the prior-art arrangement in which the rough search section has an extreme degradation in its operation accuracy in the case of poor contrast, it becomes possible to improve the operation accuracy and consequently to carry out the rough search more effectively.

Moreover, the rough search section finds a maximum matching candidate point based upon the rough target image with low gradation and the rough reference image, and the precise search section finds a maximum matching point in the proximity of the maximum matching candidate point based upon the reference image and target image with high gradation Therefore, as compared with a case where the maximum matching point is directly found from the target image and the reference image, the amount of calculations can be greatly reduced, and the circuit scale of the positioning device can be minimized.

Meanwhile, various arrangements are proposed with respect to the construction in which the gradation-converting operation of the first gradation conversion section is adjusted in accordance with the features of the target image. For example, in one preferable arrangement, the first calculating section calculates at least either the maximum value or the minimum value of the density level of the target image, and the first gradation conversion section linearly converts the density level of the target image in a ratio determined based on the calculated value.

For example, when the linear conversion is made in a ratio based on the maximum value, information related to contrast of the target image is positively contained in the rough target image, in particular, in the case when the target image is dark as a whole, thereby making it possible to carry out an effective rough search. In contrast, when the linear conversion is made in a ratio based on the minimum value, information related to contrast of the target image is positively contained in the rough target image, in particular, in the case when the target image is bright as a whole. This thereby make it possible to carry out an effective rough search. Moreover, when the linear conversion is made in a ratio based upon both the maximum value and the minimum value, information related to contrast of the target image is positively contained in the rough target image regardless of the contrast of the target image, thereby making it possible to carry out a more effective rough search.

For detection of either of the values, the present arrangement is properly designed by, for example, installing a bit shifter in the first gradation conversion section and determining the amount of shift of the bit shifter by the above-mentioned calculated value. Therefore, the first gradation conversion section is realized by using a comparatively small-scale circuit.

Moreover, in another preferable arrangement for adjusting the gradation-converting operation of the first gradation conversion section, for example, the first calculating section is designed to detect bits whose value changes at least once all through the entire target image among a plurality of bits indicating the density levels, and the first gradation conversion section is designed to produce a rough target image by carrying out bit shifts on the densities of the target image so that the highest order bit among the bits whose value changes have been detected forms the highest order bit of the rough target image.

This arrangement positively allows the rough target image to contain information related to contrast of the target image regardless of the contrast of the target image. Further, different from the case in which the maximum value and the minimum value are calculated, a judgement as to whether or not the value change takes place can be made for each bit. Therefore, the circuit construction of the first calculating section can be further simplified.

Furthermore, in another preferable arrangement for adjusting the gradation-converting operation of the first gradation conversion section, for example, the first calculating section is designed to calculate density histograms, and the first gradation conversion section is designed to histogram-convert the target image, for example, by carrying out histogram equalization or parametric conversions. In this arrangement, the rough target image is allowed to contain an effective density histogram related to contrast among density histograms of the target image. Thus, the operation accuracy for calculating the degree of similarity in rough search can be further improved, and an effective rough search can be provided.

Here, in order to further reduce the amount of calculations, in any of the above-mentioned arrangements, it is preferable to install an image-reducing section for reducing the resolution of an input image, for example, before the first gradation conversion section, or between the first gradation conversion section and the rough search section, that is, before the rough target image is inputted to the rough search section. With this arrangement, the resolution of the rough target image is reduced before it is inputted to the rough search section. As a result, the amount of calculations required for the rough search section to carry out a rough search is greatly reduced. Therefore, it becomes possible to realize a rough search operation on a real-time basis by hardware.

Additionally, in each of the above-mentioned arrangements, the rough search section requires a rough reference image that has been gradation-converted in order to make comparison with the rough target image. Therefore, in the case of a fixed reference image, if the rough reference image is stored, the positioning device can carry out a rough search without the need for the feature calculation and gradation conversion on the reference image. Additionally, if the feature of the reference image is stored instead of storing the rough reference image, and if the gradation conversion is carried out based upon the feature, the rough reference image can be obtained, thereby making it possible to obtain the same effects. In this case, however, it is necessary to provide a region for storing the feature of the rough reference image or the rough reference image separately from the region for storing the reference image. When the reference image is altered, it is also necessary to provide time for storing a rough reference image or the feature that is updated based upon the new reference image.

Therefore, in the case when alternation of the reference image is expected, in addition to any of the above-mentioned arrangements, it is more preferable to install (1) a second calculating section for calculating the same feature from the reference image as that calculated by the first calculating section, and (2) a second gradation conversion. The second gradation conversion section in the same manner as the first gradation conversion section, converts the gradation of the reference image so as to produce a rough reference image based upon the results of calculations in the second calculating section so that information related to contrast of the reference image is maintained to a greater extent, and so that the number of density levels of the reference image is reduced. In this arrangement, the feature calculation and gradation conversion are carried also out with respect to the reference image so as to produce a rough reference image.

Consequently, the positioning device can carry out a rough search without any problem even when the reference image is altered.

In addition, it is more preferable to install an image-reducing section for reducing the resolution of an input image, for example, before the second gradation conversion section, or between the second gradation conversion section and the rough search section, that is, before the rough reference image is inputted to the rough search section. With this arrangement, since the resolution of the rough reference image is reduced, the amount of calculations in the rough search section can be further reduced.

For a fuller understanding of the nature and advantages of the invention, reference should be made to the ensuing detailed description taken in conjunction with the accompanying drawings.

BRIEF DESCRIPTION OF THE DRAWINGS

FIGS. 4(a) and 4(b) are explanatory drawings that show a rough search operation which is carried out by superposing a reference image and a target image.

FIGS. 7(a) through 7(c) are explanatory drawings that show the relationship between an input image and an output image that has been gradation-converted by the barrel-shifter gradation conversion section in the case when the input image is dark as a whole, wherein FIG. 7(a) shows the density distribution of the input image, FIG. 7(b) shows the density distribution of an output image that has been gradation-converted by a prior-art device, and FIG. 7(c) shows the density distribution of the output image that has been gradation-converted by the barrel-shifter gradation conversion section.

FIGS. 8(a) through 8(c) are explanatory drawings that show the relationship between an input image and an output image that has been gradation-converted by the barrel-shifter gradation conversion section in the case when the input image is bright as a whole, wherein FIG. 8(a) shows the density distribution of the input image, FIG. 8(b) shows the density distribution of an output image that has been gradation-converted by a prior-art device, and FIG. 8(c) shows the density distribution of the output image that has been gradation-converted by the barrel-shifter gradation conversion section.

FIGS. 13(a) through 13(c) are explanatory drawings that show the relationship between an input image and an output image that has been gradation-converted by the LUT gradation conversion section, wherein FIG. 13(a) shows the density histogram of the input image, FIG. 13(b) shows the density histogram of an output image that has been gradation-converted by a prior-art device, and FIG. 13(c) shows the density histogram of the output image that has been gradation-converted by the LUT gradation conversion section.

DESCRIPTION OF THE EMBODIMENTS

Referring to FIGS. 1 through 10, the following description will discuss one embodiment of the present invention.

Figure 1:
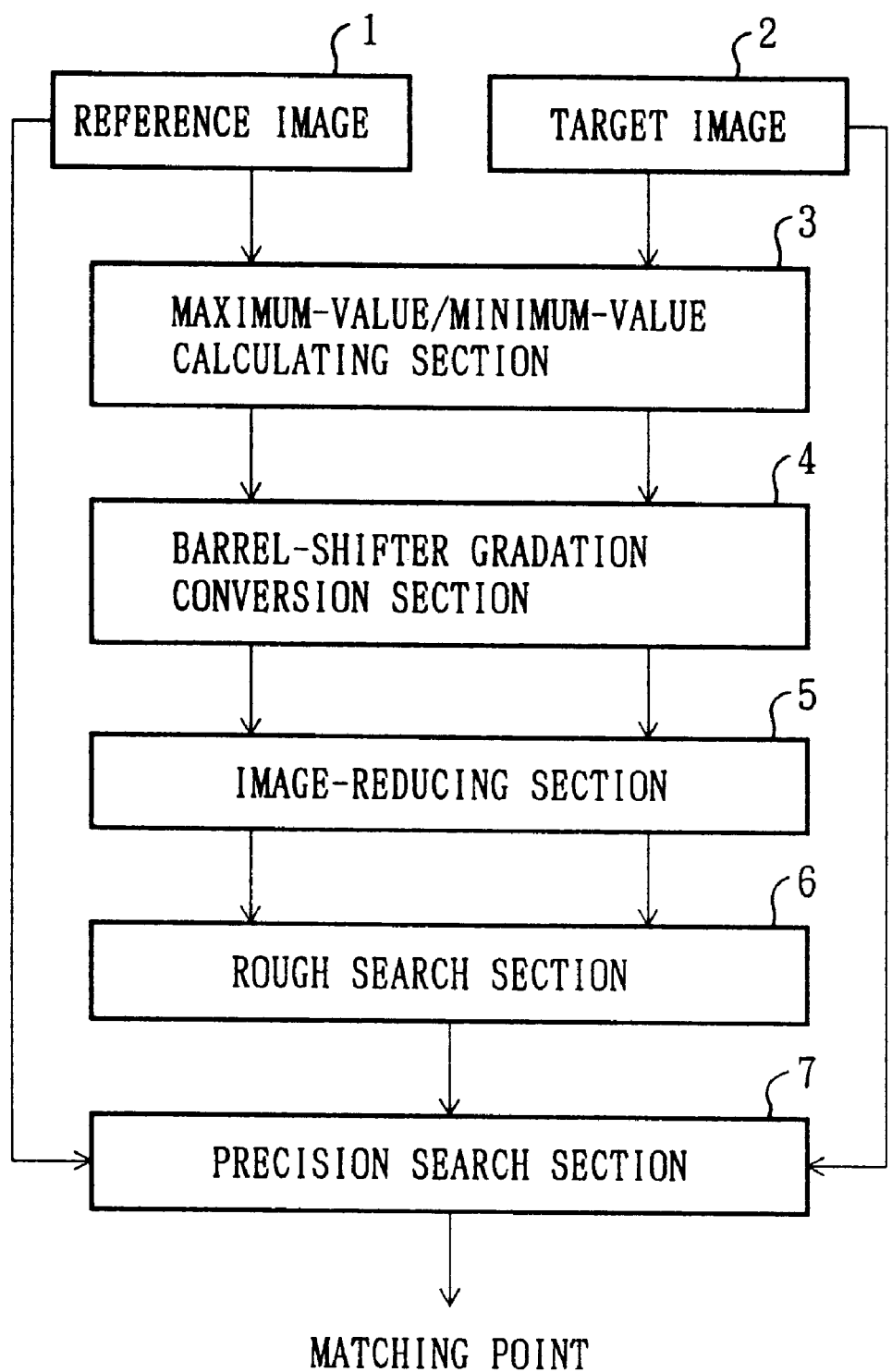
FIG. 1 is a block diagram that schematically shows a positioning device of the present invention.

First, an explanation will be given of a positioning device of the present embodiment with reference to FIG. 1. As shown in FIG. 1, the positioning device is constituted by a maximum-value/minimum-value calculating section (a first-second calculating section) 3, a barrel-shifter gradation conversion section 4 which serves as a first-second gradation conversion section (a bit shifter), an image-reducing section 5, a rough search section 6 and a precision search section 7.

With respect to a reference image 1 that has been preliminarily registered and a target image 2 that is newly inputted and that is to be positioned in relation to the reference image 1, the maximum-value/minimum-value calculating section 3 calculates the respective maximum values and the minimum values of the densities of the original images thereof.

Based upon the maximum values and the minimum values of the densities of the original images of the respective images that have been calculated by the maximum-value/minimum-value calculating section 3, the barrel-shifter gradation conversion section 4 carries out bit shifts on the original images of the reference image 1 and the target image 2 so as to allow them to contain effective bits related to contrast so that the respective images are gradation-converted so as to have numbers of density levels that are fewer than the original numbers of density levels thereof. Thereby it outputs the resulting images that have been gradation-converted (a rough reference image and a rough target image) to the image-reducing section 5.

For example, bit shifts, the number of bits of which corresponds to the maximum value and the minimum value of the densities of the original images that have been calculated by the maximum-value/minimum-value calculating section 3, are carried out so that the numbers of density levels of the reference image 1 and the target image 2 are converted to fewer numbers of density levels respectively. Thus, the reference image 1 is linearly converted in the ratio corresponding to the maximum value and minimum value of the densities of the original image, and the resulting image having gradation lower than that of the original image is inputted to the image-reducing section 5. In the same manner, the target image 2 is linearly converted in the ratio corresponding to the maximum value and minimum value of the densities of the original image, and the resulting image having gradation lower than that of the original image is inputted to the image-reducing section 5.

Referring to FIGS. 5 through 8(c), the following description will discuss how the barrel-shifter gradation conversion section 4 converts the numbers of the density levels of the reference image 1 and the target image 2 to fewer numbers of density levels.

For example, an explanation is given of a case in which the number of density bits of an original image is 8 bits and the number of density bits after the gradation conversion is 4 bits. In this case, the original image having 256 gradations is converted to have 16 gradations.

Figure 7A:
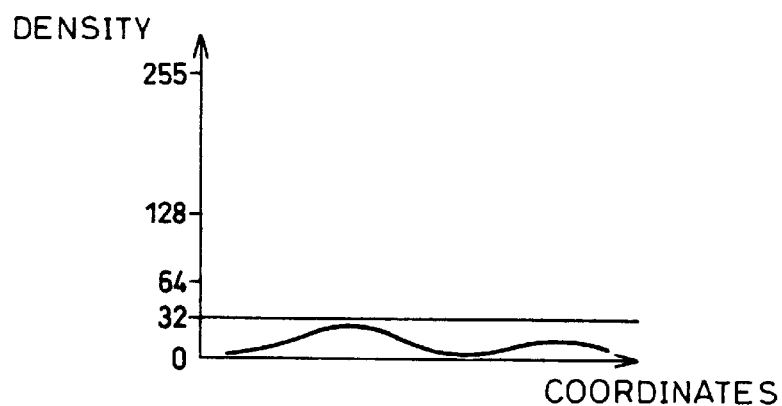
Figure 7B:
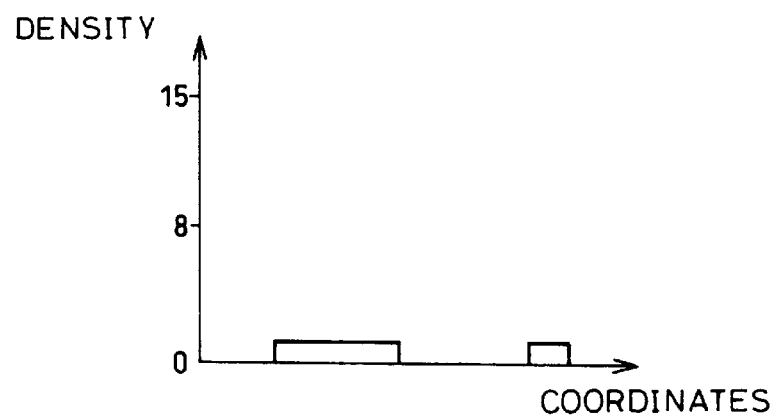

As shown in FIG. 7(a), when the density of an input image (a target image) to be inputted to the barrel-shifter gradation conversion section 4 is smaller than 32, if the gradation conversion is carried out by simply dividing by 16 as in the case of prior-art arrangements, the resulting image has extremely few gradations (two gradations), as shown in FIG. 7(b). In other words, the fewer gradations result in a lack of amount of data required for a rough search, making it impossible for the rough search section 6 to carry out an effective rough search.

Figure 7C:
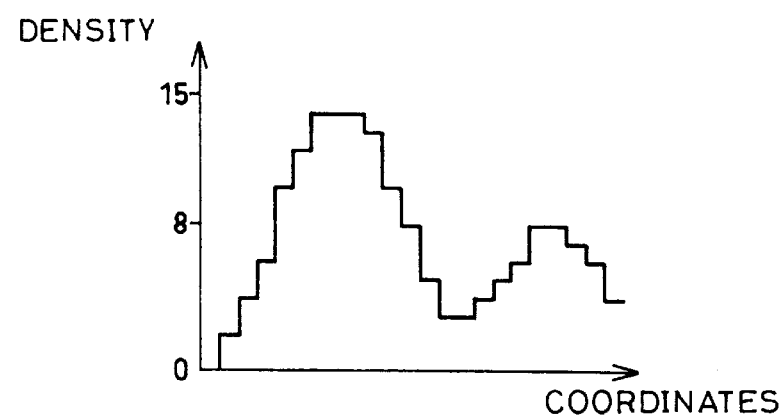

However, with the present embodiment, different from the prior art arrangement that carry out a gradation conversion merely by dividing by 16, the barrel-shifter conversion section 4 subjects an input signal as shown in FIG. 7(a) to a gradation conversion as shown in FIG. 7(c), and makes it possible to prevent degradation in gradation; thus, it becomes possible to carry out an effective rough search by using the rough search section 6.

More specifically, an explanation will be given of a case in which, for example, an original image, which is dark as a whole and whose contrast (changes in density) is small as shown in FIG. 7(a), is gradation-converted. Here, supposing that the maximum value calculated by the maximum-value/minimum-value calculating section 3 is $19_H$ (hexadecimal display), upper 3 bits of 8 bits are always "0" (see (a) of FIG. 5). These upper 3 bits (bits indicated by D7 through D5 in (a) of FIG. 5) are eliminated since they contain no effective information related to contrast. In contrast, 5 bits at the succeeding order and thereafter (bits indicated by D4 through D0 in (a) of FIG. 5) vary with the density level of the pixels contained in the original image. Therefore, these 5 bits are bits containing effective information related to contrast of the target image. Further, among these 5 bits, the lowest order bit (bit indicated by D0), which has least effects, is eliminated by being shifted by one bit rightward (toward the lowest order bit). Consequently, the resulting image represented by 4 bits, D4 through D1, is outputted from the barrel-shifter gradation conversion section 4 as an image after the gradation conversion. As a result, virtually 16 gradations are obtained as shown in FIG. 7(c), and since the image obtained after the gradation conversion contains effective bits related to contrast, it is possible to improve accuracy in finding the degree of similarity, and consequently to carry out an effective rough search.

As described above, the barrel-shifter gradation conversion section 4 controls the amount of bit shift so that when the density levels are expressed by a binary number, the bit (indicated by D4), which is located one-bit lower than the lowest order bit among bits always having the same value (bits indicated by D7 through D5) within density levels that are not more than the maximum value, forms the highest order bit after the gradation conversion; thus, the barrel-shifter gradation conversion section 4, even upon dealing with an original image which is dark as a whole and whose contrast (changes in density) is small, carries out the gradation conversion so that bits related to contrast are contained to a greater degree. Additionally, the corresponding amount of bit shift can be readily obtained by decoding the above-mentioned maximum value.

Here, in the case when the maximum value of the original image is $19_H$, if the density bits of an original image are always shifted rightwards (toward the lowest-order bit) simply by 4 bits (that is, if divided by $10_H$), the resulting gradations after the gradation conversion are two (see FIG. 7(b)), making it impossible to effectively carry out a rough search for finding a matching candidate point between the reference image 1 and the target image 2.

Figure 8A:
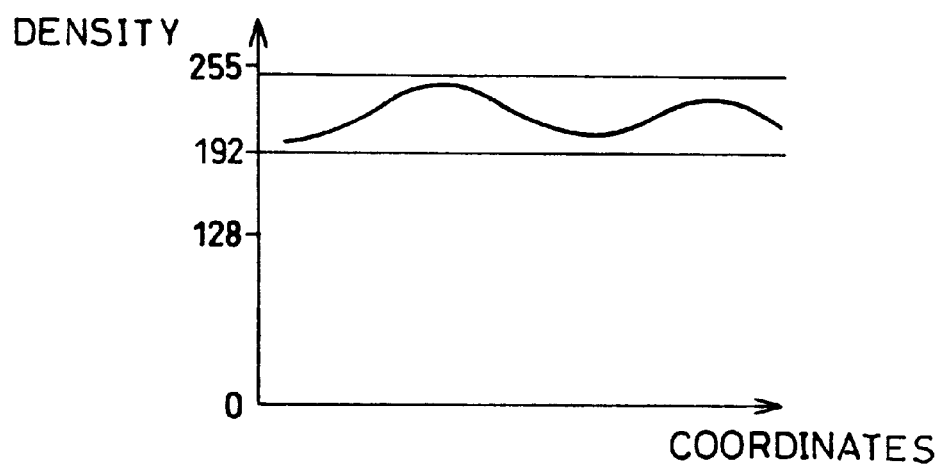

Moreover, an explanation will be given of a case in which, for example, an original image, which is bright as a whole and whose contrast (changes in density) is small as shown in FIG. 8(a), is gradation-converted. Here, supposing that the minimum value calculated by the maximum-value/minimum-value calculating section 3 is $C2_H$ (hexadecimal display), upper 2 bits of 8 bits are always "1" see (a) of FIG. 6). These upper 2 bits (bits indicated by D7 and D6 in (a) of FIG. 6) are eliminated since they contain no effective information related to contrast. In contrast, 6 bits at the succeeding order and thereafter (bits indicated by D5 through D0 in (a) of FIG. 6) vary with the density level of the pixels contained in the original image. Therefore, these 6 bits are bits containing effective information related to contrast of the target image. Further, among these 6 bits, the lower two bits (bits indicated by D1 and D0), which have least effects, are eliminated by being shifted by two bits rightward (toward the lowest order bit). Consequently, the resulting image represented by 4 bits, D5 through D2, is outputted from the barrel-shifter gradation conversion section 4 as an image after the gradation conversion. As a result, virtually 16 gradations are obtained as shown in FIG. 8(c), and since the image obtained after the gradation conversion contains effective bits related to contrast, it is possible to improve accuracy in finding the degree of similarity, and consequently to carry out an effective rough search.

As described above, the barrel-shifter gradation conversion section 4 controls the amount of bit shift so that when the density levels are expressed by a binary number, the bit (indicated by D5), which is located one-bit lower than the lowest order bit among bits always having the same value (bits indicated by D7 and D6) within density levels that are not less than the minimum value, forms the highest order bit after the gradation conversion; thus, the barrel-shifter gradation conversion section 4, even upon dealing with an original image which is bright as a whole and whose contrast (changes in density) is small, carries out the gradation conversion so that bits related to contrast are contained to a greater degree. Additionally, the corresponding amount of bit shift can be readily obtained by decoding the above-mentioned minimum value.

Figure 8B:
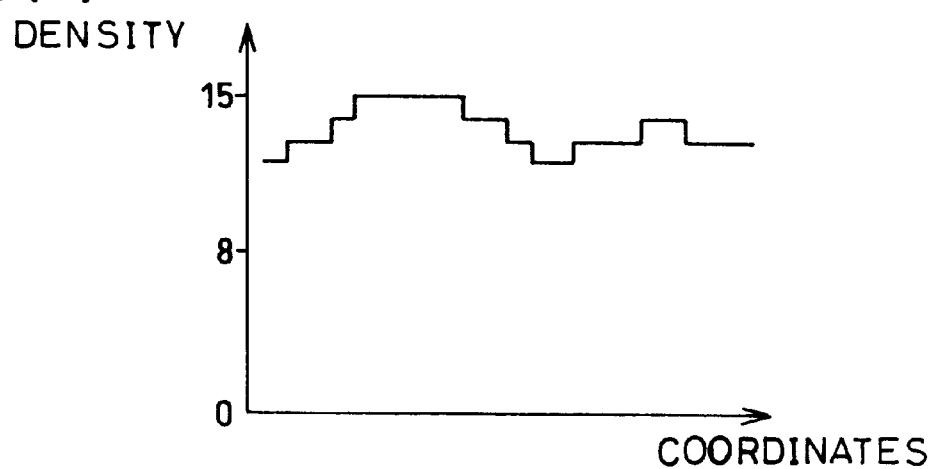
Figure 8C:
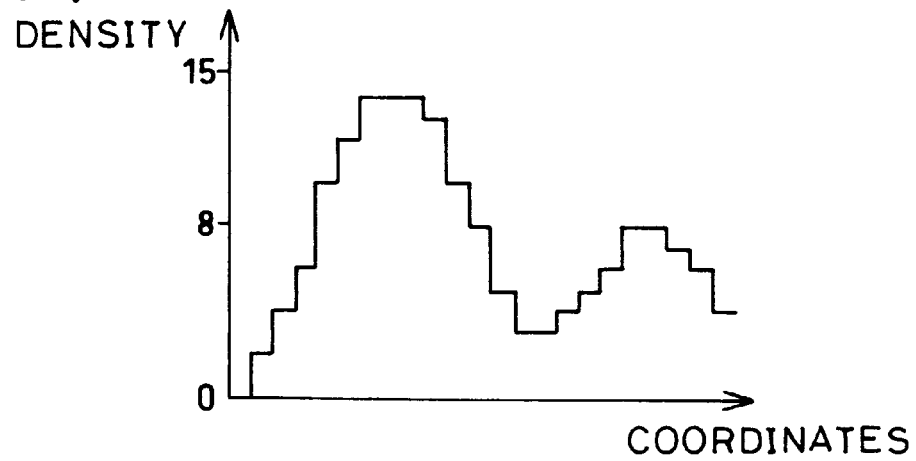

Here, in the case when the minimum value of the original image is $C2_H$, if the density bits of an original image are always shifted rightwards (toward the lowest-order bit) simply by 4 bits (that is, if divided by $10_H$), the resulting gradations after the gradation conversion are four (see FIG. 8(b)). This makes it impossible to effectively carry out a rough search for finding a matching candidate point between the reference image 1 and the target image 2.

Here, even in an arrangement wherein the maximum-value/minimum-value calculating section 3 calculates the maximum value and the barrel-shifter gradation conversion section 4 linearly converts the density level of the original image in a ratio based upon the maximum value, an effective rough search is available even upon dealing with an original image that is dark as a whole. However, if the ratio is controlled only based on the maximum value, the number of gradations after the conversion sometimes becomes undesirably small upon dealing with an original image that is bright as a whole. In this case, however, since the calculation of the minimum value is unnecessary, the construction of the maximum-value/minimum-value calculating section 3 can be simplified.

Further, even in an arrangement wherein the maximum-value/minimum-value calculating section 3 calculates the minimum value and the barrel-shifter gradation conversion section 4 linearly converts the density level of the original image in a ratio based upon the minimum value, an effective rough search is available even upon dealing with an original image that is bright as a whole. However, if the ratio is controlled only based on the minimum value, the number of gradations after the conversion sometimes becomes undesirably small upon dealing with an original image that is dark as a whole. In this case, however, since the calculation of the maximum value is unnecessary, the construction of the maximum-value/minimum-value calculating section 3 can be simplified.

In contrast, the maximum-value/minimum-value calculating section 3 in the present embodiment is designed so that both the maximum and minimum values are calculated and the barrel-shifter gradation conversion section 4 linearly converts the density level of the original image in a ratio based upon both the maximum and minimum values. For example, the amount of bit shift of the barrel-shifter gradation conversion section 4 is controlled so that, between the bit (indicated by D4 in (a) of FIG. 5) that is located one-bit lower than the lowest order bit among bits always having the same value within density levels that are not more than the maximum value and the bit (indicated by D5 in (a) of FIG. 6) that is located one-bit lower than the lowest order bit among bits always having the same value within density levels that are not less than the minimum value, the upper bit (indicated by D5 in (a) of FIG. 6) forms the highest order bit after the gradation conversion. Additionally, the circuit for selecting lower bits is achieved by a simple circuit such as, for example, a logical circuit.

As described above, based upon the maximum and minimum values of densities of the original image calculated by the maximum-value/minimum-value calculating section 3, the barrel-shifter gradation conversion section 4 carries out a gradation conversion with a desired number of bits by eliminating upper bits having the same value (0 or 1 in binary levels) consecutively as well as eliminating lower bits that have least effects. Thus, the barrel-shifter gradation conversion section 4 carries out the gradation conversion so that effective bits related to contrast of an original image are contained to a greater extent, regardless of the brightness of the original image.

Figure 5:
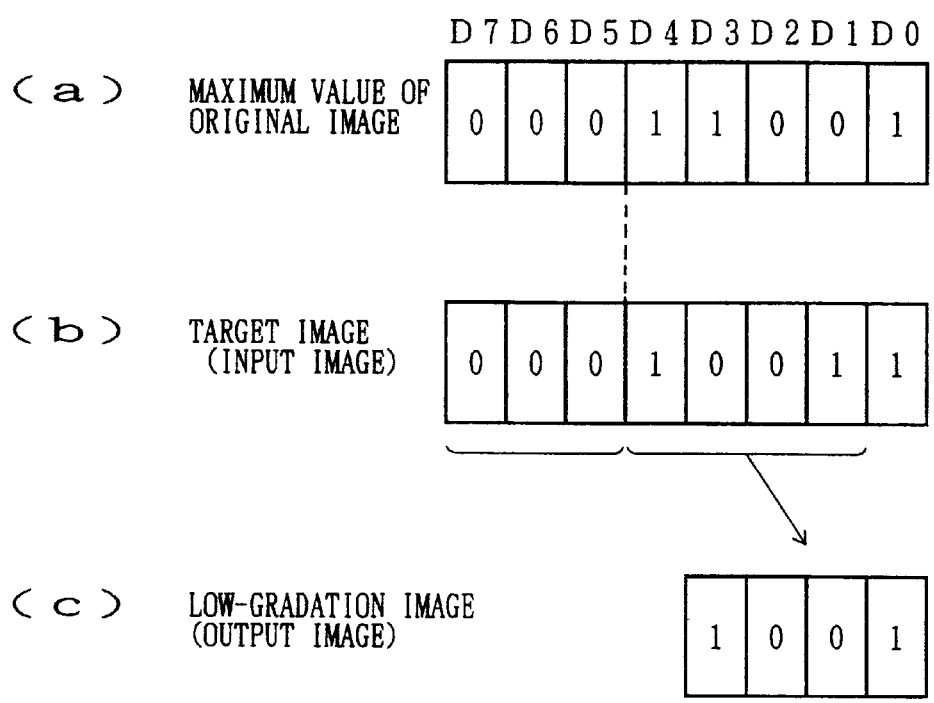
FIG. 5 is an explanatory drawing that shows an operation of the barrel-shifter gradation conversion section in the positioning device.
Figure 6:
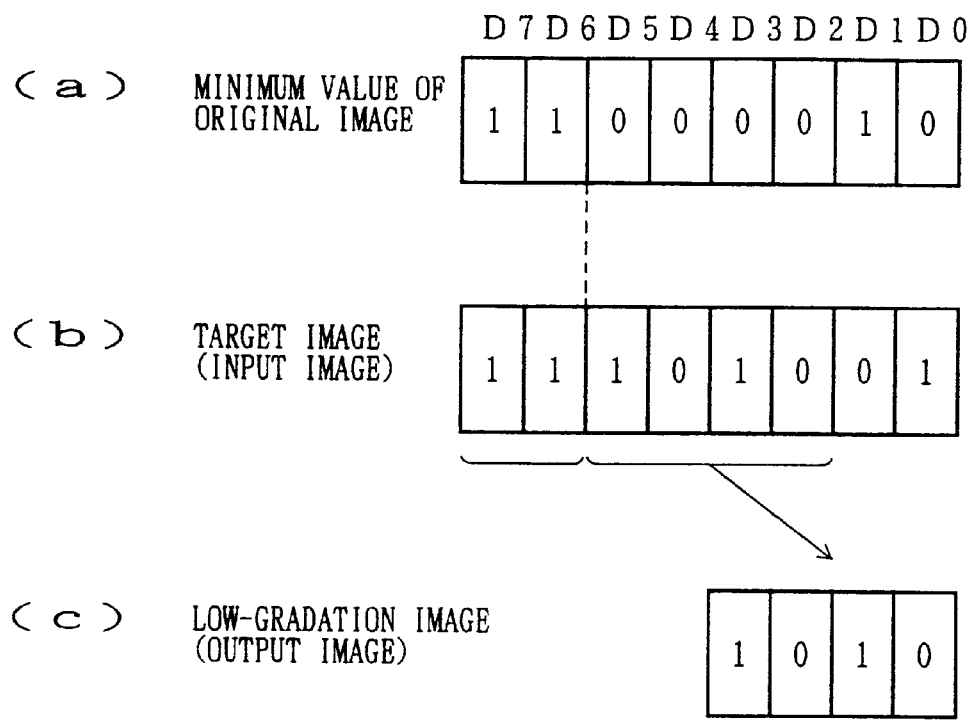
FIG. 6 is an explanatory drawing that shows another operation of the barrel-shifter gradation conversion section in the positioning device.

Additionally, FIG. 5 explains the gradation conversion of the target image 2, and with respect to the reference image 1, the same gradation conversion is carried out; therefore, the description thereof is omitted.

Figure 2:
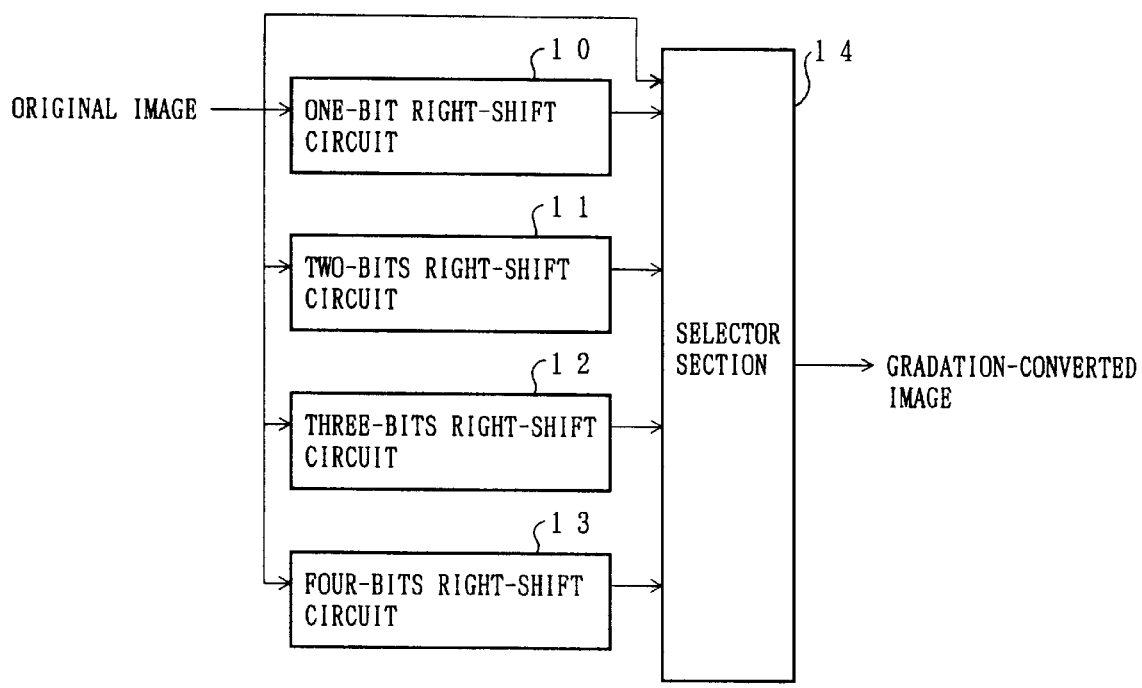
FIG. 2 is a block diagram that schematically shows a structural example of a barrel-shifter gradation conversion section of the above-mentioned positioning device.

As shown in FIG. 2, the barrel-shifter gradation conversion section 4 is, for example, constituted by: a one-bit right-shift circuit 10 for making a right shift by one bit on the density bits of an original image, a two-bits right-shift circuit 11 for making a right shift by two bits, a three-bits right-shift circuit 12 for making a right shift by three bits, a four-bits right-shift circuit 13 for making a right shift by four bits and a selector section 14 for selecting either of the outputs of the one-bit right-shift circuit 10 through the four-bits right-shift circuit 14 and the original image, based upon the results of calculations in the maximum-value/minimum-value calculation section 3.

In general, supposing that the bit numbers of the densities of the original image and the image after the gradation conversion are I and J respectively, the barrel-shifter gradation conversion section 4 is constituted by (I–J) number of shift circuits, which include a one-bit right-shift circuit for making a right shift by one bit through an (I–J)-bit right-shift circuit for making a right shift by (I–J) bits, and a selector section for selecting any one of the outputs thereof and the original image based upon the results of calculations in the maximum-value/minimum-value calculating section 3. Here, the selector section eliminates the upper bits, leaving only the lower 4 bits. Additionally, not limited to the barrel shifter, a shift register, etc., can be used, as long as it is a bit shifter which makes bit shifts by the bit width based upon the results of the calculations.

The output image with low gradations, resulted from the gradation conversion by the barrel-shifter gradation conversion section 4, is sent to the image-reducing section 5, where it is resolution-converted. In other words, the image-reducing section 5 ensures reduction of the amount of calculations required for the rough search section 6 to calculate the degree of similarity, by reducing the resolutions of the output images with low gradations resulted from the gradations conversions of the reference image 1 and the target image 2.

More specifically, for example, in the case when the reference image 1 has 64×64 pixels and the target image 2 has 512×512 pixels, if reducing operations with an area ratio of 1/16 is carried out, the reference image 1 comes to have 16×16 pixels and the target image 2 comes to have 128×128 pixels. By reducing the resolutions in this manner, the amount of calculations required for the rough search section 6 to carry out a rough search is reduced to the corresponding extent.

Therefore, since the image-reducing section 5 carries out reductions in the resolutions in addition to reduced gradations obtained by the barrel-shifter gradation conversion section 4, the amount of calculations is greatly reduced, and therefore, it becomes possible to realize a rough search operation on a real-time basis by hardware in the rough search section 6.

Figure 3:
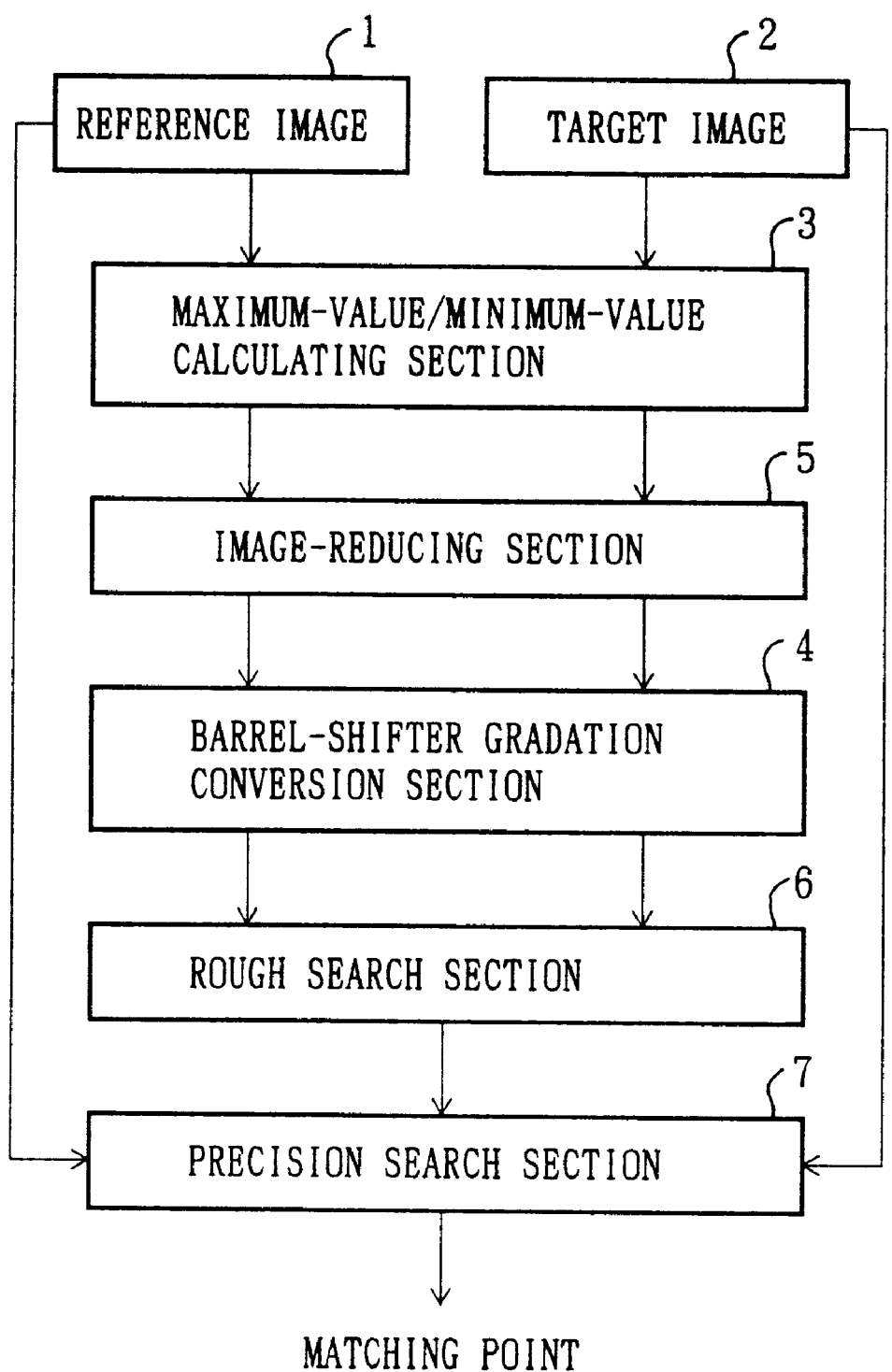
FIG. 3 is a block diagram that shows a modified example of the positioning device.

Additionally, the above explanation exemplifies a case in which the resolutions of the output images are reduced after the gradation conversions by the barrel-shifter gradation conversion section 4; however, the positioning device of the present invention is not intended to be limited thereby. For example, as shown in FIG. 3, the resolution conversion by the image-reducing section 5 may be carried out prior to the gradation conversion by the barrel-shifter gradation conversion section 4. In this case also, the same functions and effects as described above can be obtained.

The images whose resolutions have been reduced are sent to the rough search section 6, where the rough search section 6 finds the degree of similarity between the reference image 1 and the target image 2 by using the aforementioned equation (1) based upon the images that have been reduced by the image-reducing section 5 so that a maximum matching candidate point is obtained. In general, if a rough search is carried out on an entire target image 2 using an original image, an enormous amount of calculations will be required. Therefore, the application of the image-reducing section 5 makes it possible to carry out a rough search step by step by reducing the resolutions, thereby reducing the amount of calculations required to a great degree. Moreover, since the objective of a rough search is to carry out approximate positioning, the required objective is achieved by merely reducing the resolutions properly in the image-reducing section 5.

In this case, since the degree of similarity is found based upon the reduced resolutions of the output images with low gradations, the amount of calculations can be greatly reduced as compared with the case in which it is found based upon the original images without reduction; therefore, it is possible to reduce the circuit scale to the corresponding extent. Moreover, since the output images from the barrel-shifter gradation conversion section 4 contain effective bits related to contrast so that the accuracy of calculations for finding the degree of similarity in rough search is further improved; therefore, an effective rough search is available.

In the case when the degree of similarity (the degree of coincidence) between the two images is found at high speeds based upon the aforementioned equation (1), most of the calculations required are constituted by multiplications of the density values between the corresponding images and additions of the results of the multiplications. For example, as compared with the case of 8 bits in the number of density bits, the scale of the multiplier can be reduced to approximately ¼ and the scale of the adder can be reduced to approximately half in the case of 4 bits.

In the proximity of the maximum matching candidate point found by the rough search section 6, the maximum matching point between the two original images of the reference image 1 and the target image 2 is found by the precision search section 7 so that the positioning between the reference image 1 and the target image 2 is carried out. More specifically, the precision search section 7 carries out precision search in the proximity of the maximum matching candidate point found by the rough search section 6 based upon the original images by using the aforementioned equation (1), thereby finding the maximum matching point.

Additionally, the above explanation exemplifies a case in which the conversion of resolutions is carried out by the image-reducing section 5; however, the positioning device of the present invention is not intended to be limited thereby, and another arrangement without the image-reducing section 5 may be adopted. In other words, the output images which have been gradation-converted by the barrel-shifter gradation conversion section 4 may be sent to the rough search section 6 without having been reduced in their resolutions, where they may be subjected to a rough search.

Even in this case, although, different from the case in which the image-reducing section 5 is installed, the amount of calculations required for the rough search section 6 to carry out a rough search is not reduced to the extent corresponding to the reduction, effective bits related to contrast are contained after the gradation conversion by the barrel-shifter gradation conversion section 4; therefore, the accuracy in finding the degree of similarity is greatly improved, thereby making it possible to carry out an effective rough search.

Next, an explanation will be given of the operation of the positioning device of the present embodiment. For example, as illustrated in FIGS. 4($a$) and 4($b$), a reference image 1, which has been preliminarily registered and has N x N pixels, is superposed on a search area (M−N+1)×(M−N+1) within a target image 2 with M×M pixels that is larger than the reference image, and shifted so as to find a position of the upper left corner of the reference image 1 that makes the result of the aforementioned equation (1) maximum.

In the present positioning device, the rough search allows the reference image 1 to be superposed on the entire area of the target image 2 so that the maximum matching candidate point is found, and precision search finds the maximum matching point in the proximity of the maximum matching candidate point based upon the original images.

First, an explanation will be given of an operation which is carried out without the installation of the image-reducing section 5. In this case, the maximum-value/minimum-value calculating section 3 calculates the maximum value and the minimum value of densities of the original image with respect to the reference image 1. Further, with respect to the target image 2 that is to be positioned in relation to the reference image 1, the maximum-value/minimum-value calculating section 3 calculates the maximum value and the minimum value of densities of the original image.

Based upon the maximum value and the minimum value of the densities of the reference image 1 that have been calculated, the barrel-shifter gradation conversion section 4 carries out bit shifts on the original image of the reference image 1. Thus, the original image of the reference image 1 is gradation-converted so as to have a number of density levels that is fewer than the original number of density levels thereof and the resulting image outputted from the barrel-shifter gradation conversion section 4 after the gradation conversion is allowed to contain effective bits related to contrast among the bits of the original image of the reference image 1 (see (c) of FIG. 5 and (c) of FIG. 6).

In the same manner, based upon the maximum value and the minimum value of the densities of the target image 2 that have been calculated, the barrel-shifter gradation conversion section 4 carries out bit shifts on the original image of the target image 2. Thus, the original image of the target image 2 is gradation-converted so as to have a number of density levels that is fewer than the original number of density levels thereof and the resulting image outputted from the barrel-shifter gradation conversion section 4 after the gradation conversion is allowed to contain effective bits related to contrast among the bits of the original image of the target image 2.

As described above, in any of the target image 2 and the reference image 1, the output image from the barrel-shifter gradation conversion section 4 after the gradation conversion is not simply compressed in its gradations, but is allowed to have lower gradations. Further, since the output image contains effective bits related to contrast, an effective rough search is available as described below, even in the case when the target image 2 has poor contrast, such as in cases when the target image 2 is dark and when it is bright as a whole with less change in densities.

Based upon the output images with lower gradations after the gradation conversion by the barrel-shifter gradation conversion section 4, the rough search section 6 finds the similarity between the reference image 1 and the target image 2 in a search area (M−N+1)×(M−N+1) within a target image 2, and consequently finds the maximum matching candidate point. In this case, since the degree of similarity is found based upon the output images with lower gradations, the amount of calculations can be greatly reduced as compared with the case in which it is found based upon the original images; therefore, it is possible to reduce the circuit scale to the corresponding extent. Moreover, since the output images contain effective bits related to contrast so that the accuracy of calculations for finding the degree of similarity in rough search is further improved; therefore, an effective rough search is available.

In the proximity of the maximum matching candidate point found by the rough search section 6, the precision search section 7 finds the maximum matching point between the two original images of the reference image 1 and the target image 2, thereby carrying out positioning between the reference image 1 and the target image 2.

Next, an explanation will be given of an operation which is carried out with the installation of the image-reducing section 5. In this case, in addition to the operation that is carried out without the installation of the image-reducing section 5, the image-reducing section 5 reduces the resolutions, and the resolutions are consequently reduced by the image-reducing section 5 with respect to the output images after the gradation conversion by the barrel-shifter gradation conversion section 4. As a result, the amount of calculations required for the rough search section 6 to carry out a rough search can be reduced to the extent corresponding to the reduction of the resolutions of the output images.

Therefore, since the image-reducing section 5 carries out reductions in the resolutions in addition to reduced gradations obtained by the barrel-shifter gradation conversion section 4, the amount of calculations is greatly reduced. Therefore, it becomes possible to realize a rough search operation on a real-time basis by hardware in the rough search section 6.

Additionally, the positioning device of the present invention can be applied not only to image positioning for use in, for example, manufacturing lines, but also to recognition for characters and objects and feature-extraction for extracting features required for recognition of images from a multi-value image.

Meanwhile, in the above explanation, the bit width, which is used when the barrel-shifter gradation conversion section 4 carries out bit shifts on the reference image 1 and the target image 2 so as to produce the rough images, is determined based on the maximum value and the minimum value of the densities of the respective original images. However, the bit width may be calculated by detecting whether or not a bit change takes place, as will be described below.

Figure 9:
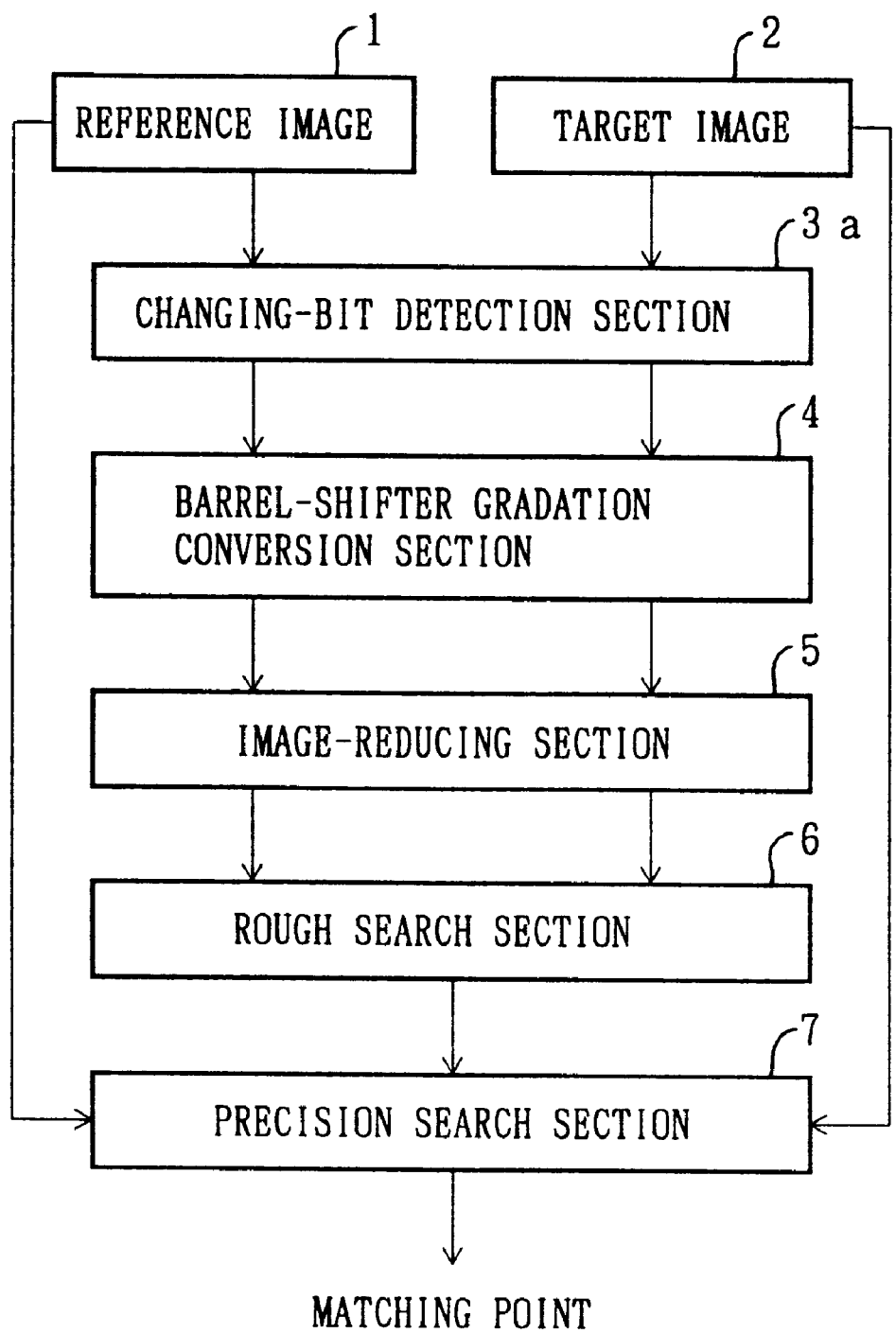
FIG. 9 is a block diagram that shows a modified example of the positioning device.
Figure 10:
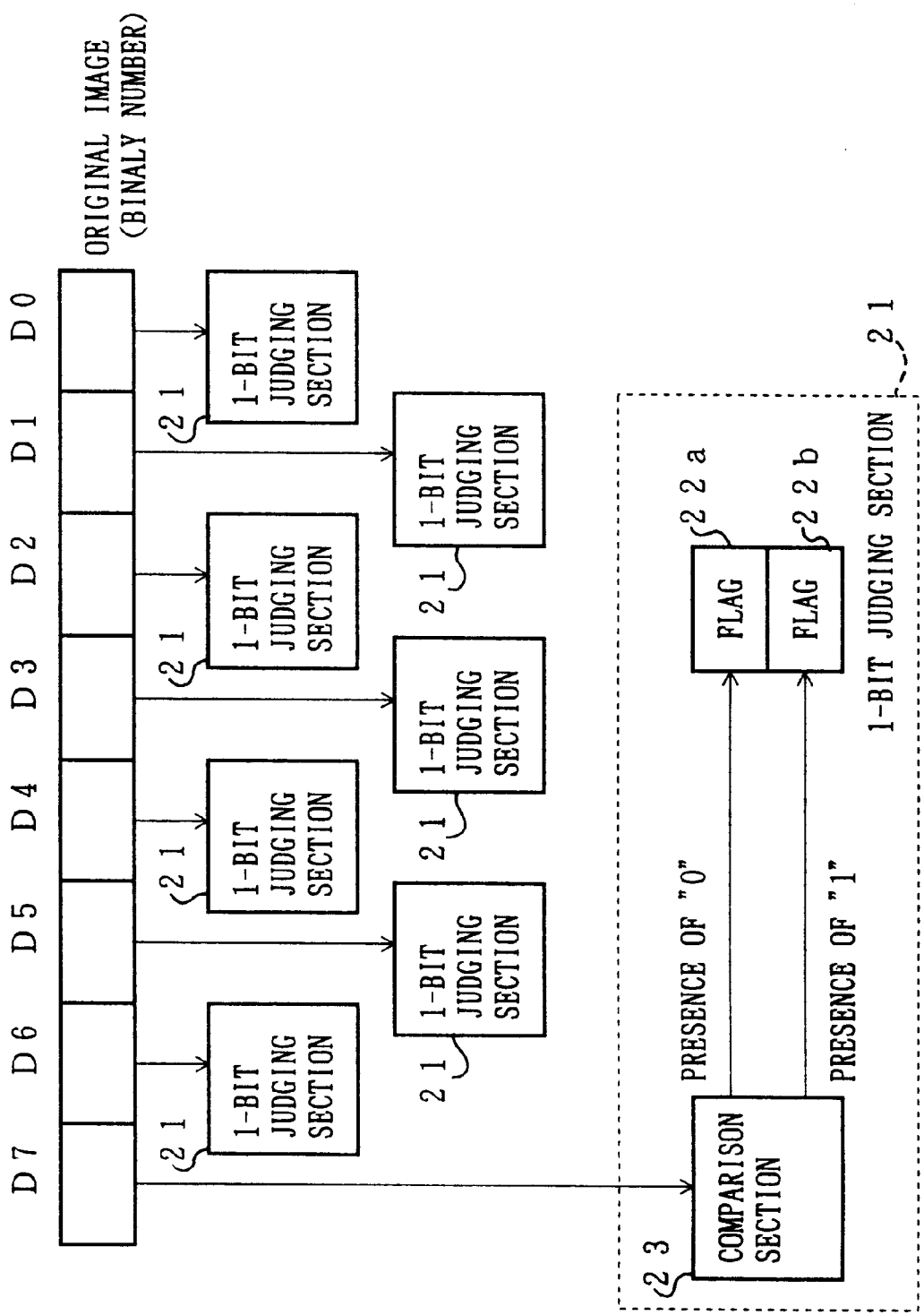
FIG. 10 is a block diagram that shows a changing-bit detection section installed in the positioning device.

More specifically, as illustrated in FIG. 9, a positioning device in accordance with the present modified example is provided with a changing-bit detection section (first and second calculating sections) 3a, in place of the maximum-value/minimum-value calculating section 3 shown in FIG. 1. For example, as shown in FIG. 10, in the changing-bit detection section 3a, 1-bit judging sections 21, which make a judgement as to whether or not the value has changed all over the entire image to be inputted, are installed for respective binary bit positions indicating the density levels. Here, each 1-bit judging section 21 is provided with a flag 22a indicating the presence of a pixel that makes the value of the corresponding bit position "0", a flag 22b indicating the presence of a pixel that makes the value of the corresponding bit position "1", and a comparison section 23 which, each time a binary number indicating the density level of one of the pixels constituting the original image is given thereto, makes a comparison as to whether the value of each of the bit positions of the binary number is "0" or "1", and stores the presence or absence of the respective values in the flag 22a or 22b that correspond to the bit position in question.

For example, supposing that the upper four bits of a binary number indicating the density level of a certain pixel are "1010", the comparison section 23 raises the flag 22a of the highest order bit since the value of the highest order bit is "1". Further, since the value of the highest order bit is not "0", it does not operate the flag 22b of the highest order bit. In the same manner, since the value of the next order bit is "0", it raises the flag 22b without altering the flag 22a of the next order bit.

These flag-setting operations regarding the respective bit positions are repeated each time a binary number indicating the density level of each of the pixels constituting the original image is given. As a result, if the value in a certain bit position changes among pixels constituting the entire original image, both of the flags 22a and 22b corresponding to the bit position are raised, while if the value in a certain bit position does not change all through the entire original image, only one of the flags 22a and 22b corresponding to the bit position is raised.

Therefore, the barrel-shifter gradation conversion section 4 refers to the flags 22a and 22b regarding to each of the bit positions, and extracts bits that continue from the highest order bit among bits always having the same value (having no change); thus, it is possible to determine the bit width so that the bit which is located one-bit lower than the lowest order bit among the bits in question forms the highest order bit, upon carrying out the bit shifts. In other words, the bit width is determined so that the highest order bit among bits whose changes in value have been detected forms the highest order bit of the rough image. For example, in the case when the four bits from the highest order bit are fixed to "1010", a gradation conversion is carried out by using the next order bit to these four bits (the fifth bit) as the highest order bit. Additionally, after the bit width has been calculated, the flags 22a and 22b regarding each of the bit positions are reset by the time when the next original image is given.

In the above-mentioned arrangement, with respect to binary numbers indicating the density levels, the values are compared for each of the bit positions, and a judgement is made as to whether or not any change takes place at each of the bit positions, without calculating the maximum value and the minimum value. In this case, the comparison at each bit can be made by using a smaller-size circuit, as compared with the case in which the maximum value and the minimum value are calculated. Therefore, even upon dealing with an original image which has little density changes, the gradation conversion can be carried out so that bits related to contrast are contained to a greater degree, by using a very simple circuit.

EMBODIMENT 2

Referring to FIGS. 4(a) and 4(b) as well as FIGS. 11 through 14, the following description will discuss another embodiment of the present invention. Here, those members that have the same functions and that are described in embodiment 1 are indicated by the same reference numerals and the description thereof is omitted.

Figure 11:
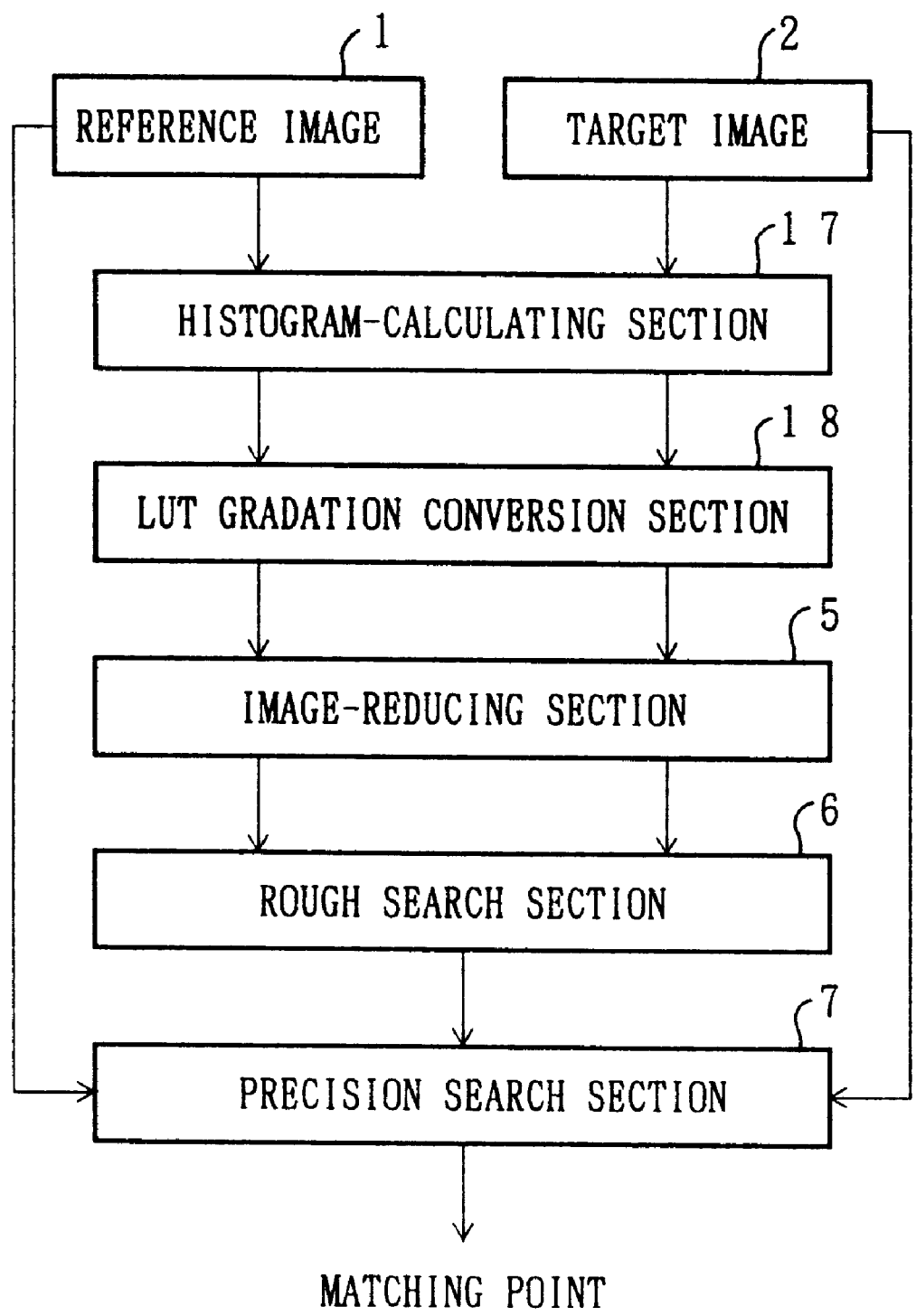
FIG. 11 is a block diagram that schematically shows another positioning device in accordance with the present invention.

As illustrated in FIG. 11, the positioning device of the present embodiment is mainly constituted by a histogram-calculating section 17 serving as a histogram-calculating means, a LUT (Look Up Table) gradation conversion section 18 serving as first and second gradation conversion sections, an image-reducing section 5 serving as an image-reducing means, a rough search section 6 serving as a rough search means and a precise search section 7 serving as a precise search means.

In the histogram-calculating section 17, density histograms are calculated with respect to a reference image 1 that has been preliminarily registered and a target image 2 that is newly inputted and that is to be positioned in relation to the reference image 1. The density histogram is defined as the degree of frequency at which each density value of the reference image 1 or the target image 2 appears, that is, the number of pixels having each density value or the rate of the number of those pixels to the total number of pixels.

Based upon the density histogram thus calculated, the LUT gradation conversion section 18 carries out respective histogram conversions so that effective density histograms related to contrast are contained, gradation-converts the two image so that they have fewer numbers of density levels than the original numbers of density levels, and releases the resulting converted images.

Referring to FIGS. 12 and FIGS. 13(a) through 13(c), the following description will discuss how the LUT gradation conversion section 18 converts the reference image 1 and the target image 2 so as to have fewer numbers of density levels than the original numbers of density levels.

For example, an explanation is given of a case in which the number of density bits of an original image is 8 bits and the number of density bits after the gradation conversion is 4 bits. In this case, the original image having 256 gradations is converted to have 16 gradations.

Figure 13A:
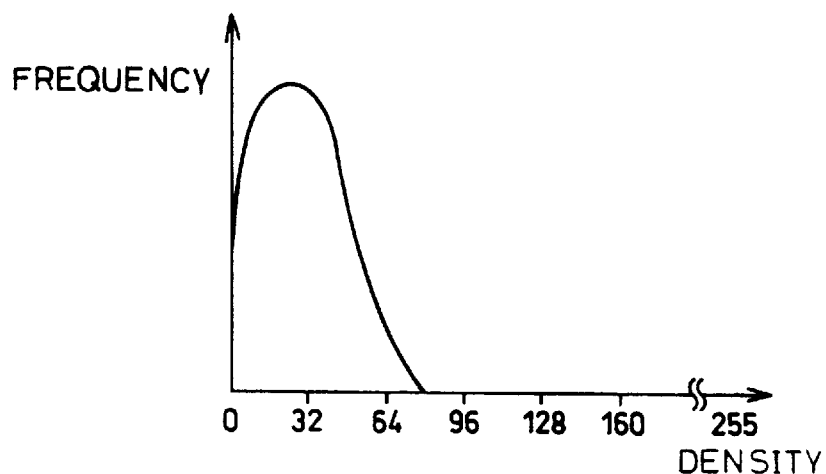
Figure 13B:
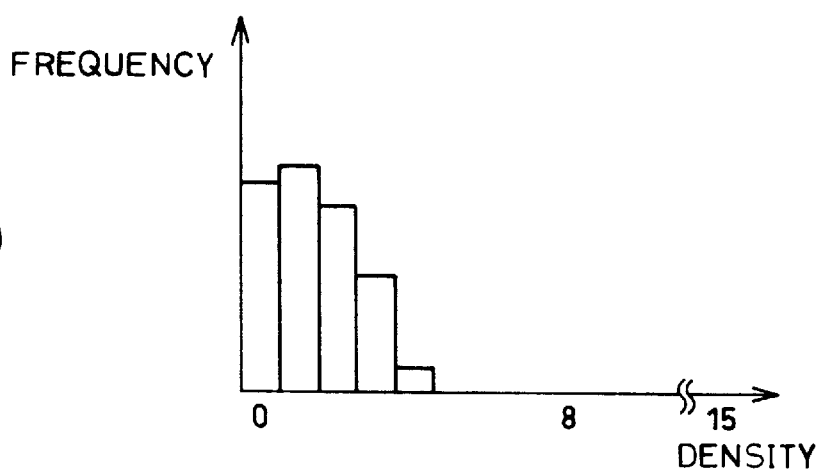

Assume now that the density of an input image (a target image) to be inputted to the LUT gradation conversion section 18 is dark as a whole and that its histogram has no values of luminance not less than 80 as shown in FIG. 13(a). In this case, if the gradation conversion is carried out by simply dividing by 16, the resulting image has merely 5 gradations, as shown in FIG. 13(b). In other words, the fewer gradations result in a lack of amount of data required for a rough search, making it impossible for the rough search section 6 to carry out an effective rough search.

Figure 13C:
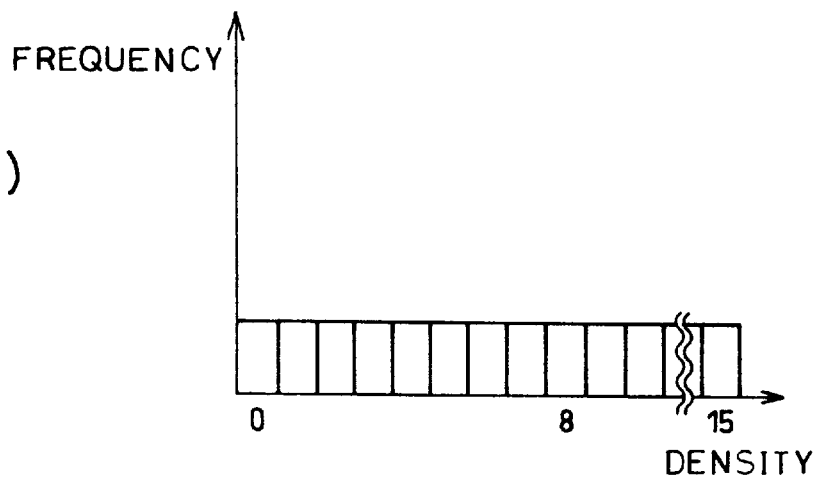

However, with the present embodiment, different from the prior art arrangement that carry out a gradation conversion merely by dividing by 16, the LUT gradation conversion section 18 subjects an input signal as shown in FIG. 13(a) to a histogram conversion, such as histogram equalization as shown in FIG. 13(c), and makes it possible to prevent degradation in gradation; thus, it becomes possible to carry out an effective rough search by using the rough search section 6.

Figure 12:
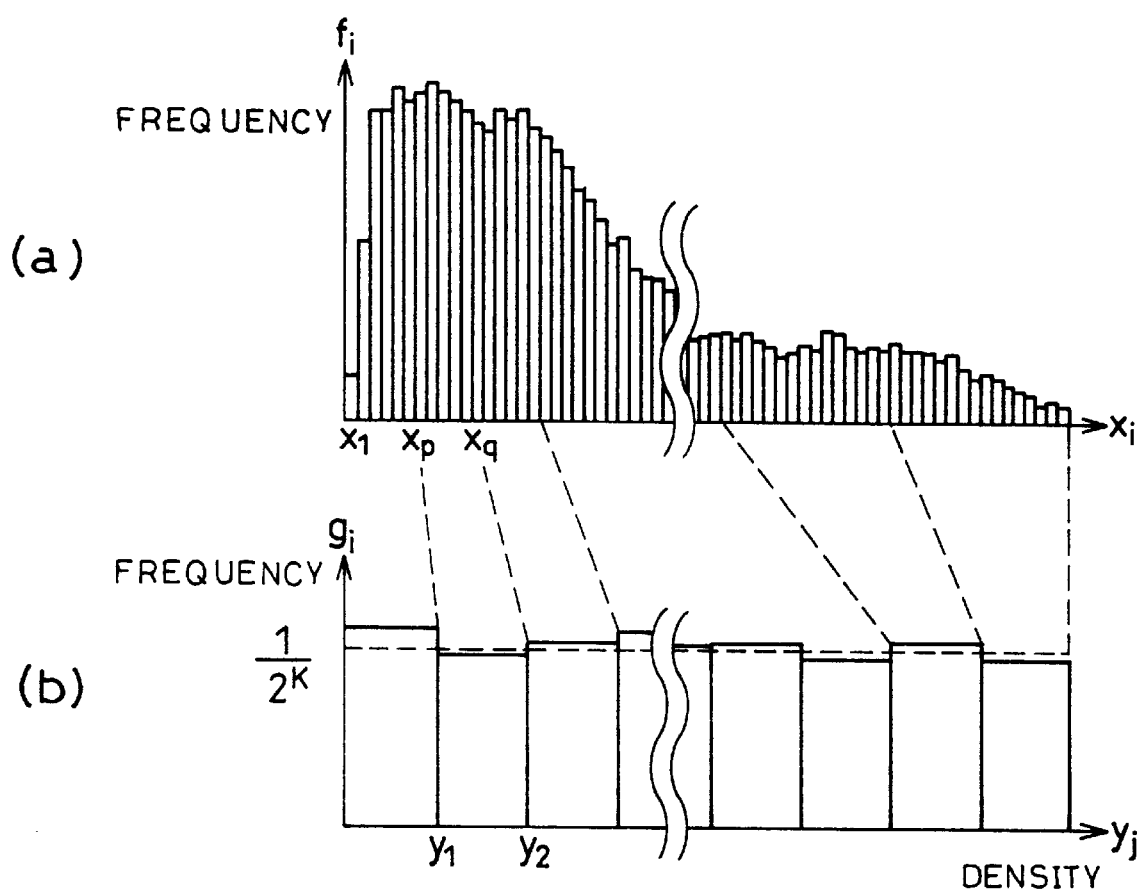
FIG. 12 is an explanatory drawing that shows a equalized density histogram made by an LUT gradation conversion section of the positioning device of FIG. 11.

In accordance with the LUT gradation conversion section 18, for example, as shown in FIG. 12, with respect to a density area having a high frequency of occurrence, more gradations are allocated to the density area depending on the frequency of occurrence, while with respect to a density area having a low frequency of occurrence, fewer gradations are allocated to the density area depending on the frequency of occurrence.

FIG. 12 shows an example of the histogram conversion in which the numbers of density bits of the original images are L bits and the numbers of density bits after the conversion are K bits, that is, equalizing processes are carried out by making gradation conversions from $2^L$ gradations to $2^K$ gradations (that is, histogram equalizing processes are carried out). Item (a) of FIG. 12 shows an example of a density histogram calculated by the histogram-calculating section 17, and (b) of FIG. 12 shows an example of the histogram equalizing process and the result of the gradation conversion.

In the histogram equalizing processes, supposing that the density histogram of each original image is $f_i$ (i=1, 2, 3, . . . , $2^L$), the equalizing process is carried out so that the target histogram $g_i$ (i=1, 2, 3, . . . , $2^K$) has a virtually uniform distribution. That is, the equalizing process is carried out so that $g_i = \frac{1}{2}^K$ holds.

More specifically, the frequencies of density values are added successively from the minimum density value of the original image and when the added value becomes closest to $\frac{1}{2}^K$, the minimum density value $y_1$ after conversion is given to the pixel located in the corresponding density-value area $(x_1, x_p)$. Next, the frequencies of density values are added successively from the density value $x_{p+1}$ of the original image, and when the added value becomes closest to $\frac{1}{2}^K$ the density value $Y_2$ after conversion is given to the pixel located in the corresponding density-value area $(x_{p+1}, x_q)$. Thereafter, the histogram equalizing process is carried out by successively converting the density value $x_i$ of the original image to $y_i$. In other words, the histogram conversion is carried out by the histogram equalization so that more gradations are allocated to a density area having a high frequency of occurrence, while fewer gradations are allocated to a density area having a low frequency.

Additionally, although, for convenience of explanation, the above-mentioned description has discussed a case in which an input image (a target image) that is to be inputted to the LUT gradation conversion section 18 is dark as a whole, the present invention is not intended to be limited by this state. The same histogram equalizing process can be carried out also in a case when the input image (the target image) that is to be inputted to the LUT gradation conversion section 18 is bright as a whole.

Moreover, with respect to methods for histogram conversion, the present invention is not intended to be limited by the above-mentioned method, and in addition to the histogram equalizing process, another method, such as linear conversion (which, in the case when the histogram of an original image is distributed only in a limited portion within the allowable density-value area, extends the density-value area to a wider value area in a linear manner so as to improve the contrast of the original image) and parametric conversion (which is a conversion for improving the contrast of density-value areas having high degrees of frequency without reducing the contrast of density-value areas having low degrees of frequency so much); and these methods may be selected on demand.

For example, although the histogram equalizing process emphasizes the contrast of the density-value areas having high degrees of frequency, it reduces the contrast of the density-value areas having low degrees of frequency. However, the application of the parametric conversion makes it possible to improve the contrast of density-value areas having high degrees of frequency without reducing the contrast of density-value areas having low degrees of frequency so much.

As described above, for example, in the case when the degrees of frequency are high within density areas smaller than the density of 80 as shown in FIG. 13(a), that is, in the case when the pixel density values are concentrated on a specific value area (in the case of poor contrast), different from the prior art arrangement that carry out a gradation conversion merely by dividing by 16, the gradation conversion of the LUT gradation conversion section 18 makes it possible to prevent degradation in gradation (to make an increase from 5 gradations to 16 gradations), and consequently to carry out an effective rough search by using the rough search section 6.

The output image with low gradations, resulted from the gradation conversion by the LUT gradation conversion section 18, is sent to the image-reducing section 5, where it is resolution-converted. In other words, the image-reducing section 5 ensures reduction of the amount of calculations required for the rough search section 6 to calculate the degree of similarity, by reducing the resolutions of the output images with low gradations resulted from the gradations conversions of the reference image 1 and the target image 2.

More specifically, for example, in the case when the reference image 1 has 64×64 pixels and the target image 2 has 512×512 pixels, if reducing operations with an area ratio of 1/16 is carried out, the reference image 1 comes to have 16×16 pixels and the target image 2 comes to have 128×128 pixels. By reducing the resolutions in this manner, the amount of calculations required for the rough search section 6 to carry out a rough search is reduced to the corresponding extent.

Therefore, since the image-reducing section 5 carries out reductions in the resolutions in addition to reduced gradations obtained by the LUT gradation conversion section 18, the amount of calculations is greatly reduced, and therefore, it becomes possible to realize a rough search operation on a real-time basis by hardware in the rough search section 6.

Figure 14:
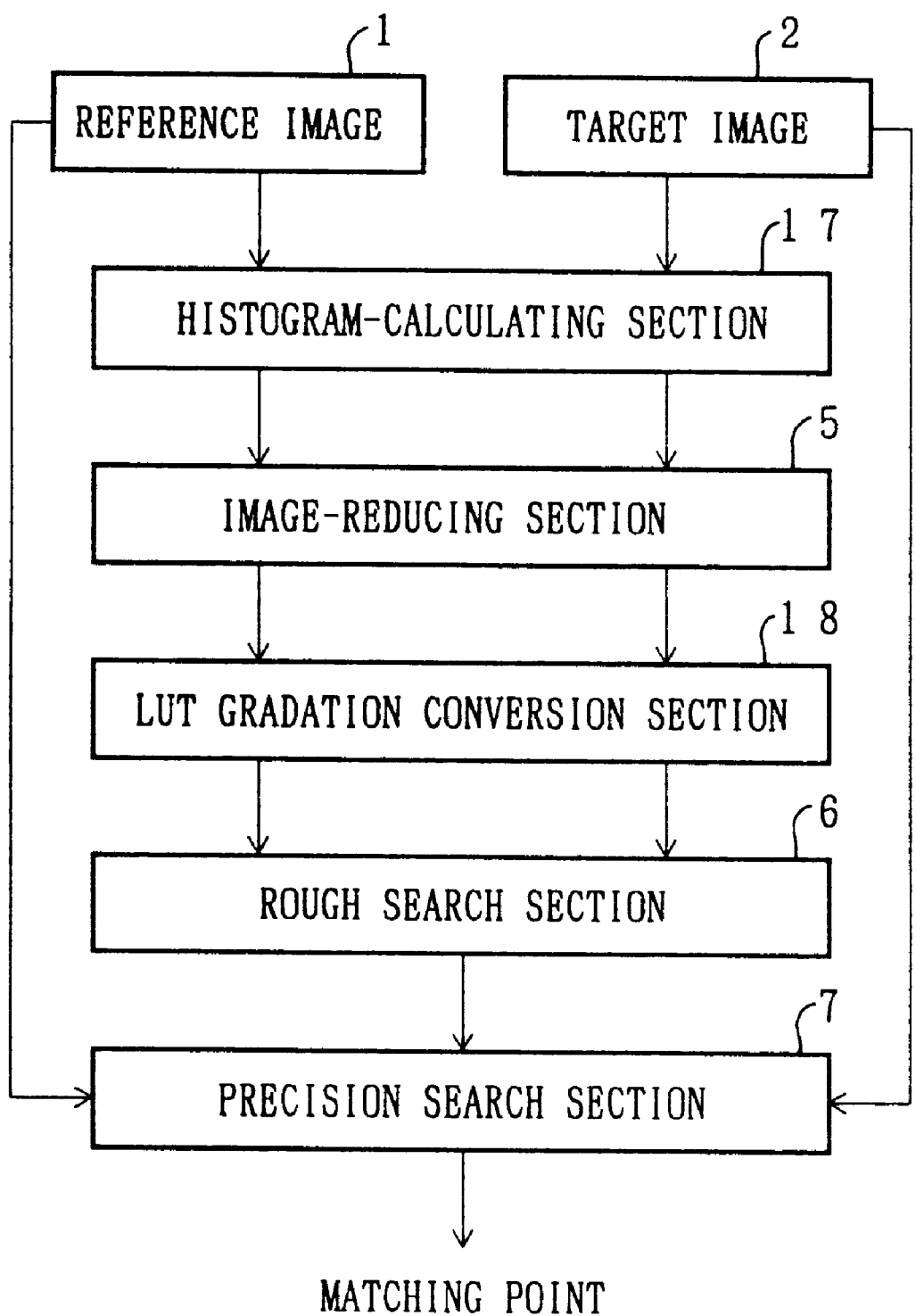
FIG. 14 is a block diagram that shows a modified example of the positioning device.

Additionally, the above explanation exemplifies a case in which the resolutions of the output images are reduced after the gradation conversions by the LUT gradation conversion section 18; however, the positioning device of the present invention is not intended to be limited thereby. For example, as shown in FIG. 14, the resolution conversion by the image-reducing section 5 may be carried out prior to the gradation conversion by the LUT gradation conversion section 18. In this case also, the same functions and effects as described above can be obtained.

The images whose resolutions have been reduced are sent to the rough search section 6, where the rough search section 6 finds the degree of similarity between the reference image 1 and the target image 2 by using the aforementioned equation (1) based upon the images that have been reduced by the image-reducing section 5 so that a maximum matching candidate point is obtained. Here, the application of the image-reducing section 5 makes it possible to carry out a rough search step by step by reducing the resolutions, thereby reducing the amount of calculations required to a great degree. Moreover, since the objective of a rough search is to carry out approximate positioning, the required objective is achieved by merely reducing the resolutions properly in the image-reducing section 5.

In this case, since the degree of similarity is found based upon the reduced resolutions of the output images with low gradations, the amount of calculations can be greatly reduced as compared with the case in which it is found based upon the original images without reduction; therefore, it is possible to reduce the circuit scale to the corresponding extent. Moreover, since the output images from the LUT gradation conversion section 18 contain effective density histograms related to contrast so that the accuracy of calculations for finding the degree of similarity in rough search is further improved; therefore, an effective rough search is available.

In the same manner as Embodiment 1, for example, as compared with the case of 8 bits in the number of density bits, the scale of the multiplier can be reduced to approximately 1/4 and the scale of the adder can be reduced to approximately half in the case of 4 bits.

In the proximity of the maximum matching candidate point found by the rough search section 6, the maximum matching point between the two original images of the reference image 1 and the target image 2 is found by the precision search section 7 so that the positioning between the reference image 1 and the target image 2 is carried out. More specifically, the precision search section 7 carries out precision search in the proximity of the maximum matching candidate point found by the rough search section 6 based upon the original images by using the aforementioned equation (1), thereby finding the maximum matching point.

Additionally, the above explanation exemplifies a case in which the conversion of resolutions is carried out by the image-reducing section 5; however, the positioning device of the present invention is not intended to be limited thereby, and another arrangement without the image-reducing section 5 may be adopted. In other words, the output images which have been gradation-converted by the LUT gradation conversion section 18 may be sent to the rough search section 6 without having been reduced in their resolutions, where they may be subjected to a rough search.

Even in this case, although, different from the case in which the image-reducing section 5 is installed, the amount of calculations required for the rough search section 6 to carry out a rough search is not reduced to the extent corresponding to the reduction, effective density histograms related to contrast are contained after the gradation conversion by the LUT gradation conversion section 18; therefore, the accuracy in finding the degree of similarity is greatly improved, thereby making it possible to carry out an effective rough search.

Next, an explanation will be given of the operation of the positioning device of the present embodiment. For example, as illustrated in FIGS. 4(*a*) and 4(*b*), a reference image 1, which has been preliminarily registered and has N×N pixels, is superposed on a search area (M−N+1)×(M−N+1) within a target image 2 with M×M pixels that is larger than the reference image, and shifted so as to find a position of the upper left corner of the reference image 1 that makes the result of the aforementioned equation (1) maximum.

In the present positioning device, the rough search allows the reference image 1 to be superposed on the entire area of the target image 2 so that the maximum matching candidate point is found, and precision search finds the maximum matching point in the proximity of the maximum matching candidate point based upon the original images.

First, an explanation will be given of an operation which is carried out without the installation of the image-reducing section 5. In this case, the histogram-calculating section 17 calculates the density histogram of the original image with respect to the reference image 1. Further, with respect to the target image 2 that is to be positioned in relation to the reference image 1, the histogram-calculating section 17 calculates the density histogram of the original image.

Based upon the density histograms of the reference image 1 that have been calculated, the LUT gradation conversion section 18 carries out a histogram conversion on the original image of the reference image 1. Thus, the original image of the reference image 1 is gradation-converted so as to have a number of density levels that is fewer than the original number of density levels thereof, and consequently, the resulting image after the gradation conversion is allowed to contain effective histograms related to contrast among the histograms of the original image of the reference image 1.

In the same manner, based upon the density histograms of the target image 2 that have been calculated by the histogram-calculating section 17, the LUT gradation conversion section 18 carries out a histogram conversion on the original image of the target image 2. Thus, the original image of the target image 2 is gradation-converted so as to have a number of density levels that is fewer than the original number of density levels thereof, and consequently, the resulting image after the gradation conversion is allowed to contain effective density histograms related to contrast among the histograms of the original image of the target image 2.

As described above, in any of the target image 2 and the reference image 1, the output image after the gradation conversion is not simply compressed in its gradations, but is allowed to have lower gradations, and since the output image contains effective density histograms related to contrast, an effective rough search is available as described below, even in the case when the target image 2 has poor contrast, such as in cases when the target image 2 is dark and when it is bright as a whole with less change in densities.

Based upon the output images with lower gradations after the gradation conversion by the LUT gradation conversion section 18, the rough search section 6 finds the similarity between the reference image 1 and the target image 2, and consequently finds the maximum matching candidate point. In this case, since the degree of similarity is found based upon the output images with lower gradations, the amount of calculations can be greatly reduced as compared with the case in which it is found based upon the original images; therefore, it is possible to reduce the circuit scale to the corresponding extent. Moreover, since the output images contain effective density histograms related to contrast so that the accuracy of calculations for finding the degree of similarity in rough search is further improved; therefore, an effective rough search is available. In the positioning device of the present embodiment, since the output images contain effective density histograms related to contrast, the calculating accuracy in carrying out the rough search is further improved as compared with Embodiment 1.

In the proximity of the maximum matching candidate point found by the rough search section 6, the precision search section 7 finds the maximum matching point between the two original images of the reference image 1 and the target image 2, thereby carrying out positioning between the reference image 1 and the target image 2.

Next, an explanation will be given of an operation which is carried out with the installation of the image-reducing section 5. In this case, in addition to the operation that is carried out without the installation of the image-reducing section 5, the image-reducing section 5 reduces the resolutions, and the resolutions are consequently reduced by the image-reducing section 5 with respect to the output images after the gradation conversion by the LUT gradation conversion section 18. As a result, the amount of calculations required for the rough search section 6 to carry out a rough search can be reduced to the extent corresponding to the reduction of the resolutions of the output images.

Therefore, since the image-reducing section 5 carries out reductions in the resolutions in addition to reduced gradations obtained by the LUT gradation conversion section 18, the amount of calculations is greatly reduced, and therefore, it becomes possible to realize a rough search operation on a real-time basis by hardware in the rough search section 6.

Additionally, the positioning device of the present invention can be applied not only to image positioning for use in, for example, manufacturing lines, but also to recognition for characters and objects and feature-extraction for extracting features required for recognition of images from a multi-value image.

In the above-mentioned Embodiments 1 and 2, in order to allow the positioning device to deal with alternation to the reference image, the calculating section, such as a maximum-value/minimum-value calculation section 3 or a histogram-calculating section 17, calculates the features (for example, maximum values and minimum values or density histograms) of the original images of the reference image 1 and the target image 2 and the gradation conversion section, such as a barrel-shifter gradation conversion section 4 or a LUT gradation conversion section 18, gradation-converts the original images of the two images based upon the calculated features, thereby generating a rough reference image and a rough target image; however, the present invention is not limited by these arrangements.

For example, if a rough reference image is preliminarily generated and stored, the rough search section 6 carries out the rough search based upon the generated rough target image and the corresponding rough reference image. In this case, the feature calculation on the reference image and the gradation conversion for generating a rough reference image can be eliminated from the positioning device. Moreover, instead of storing the rough reference image, the feature of the reference image may be preliminarily calculated, and the calculated value may be stored. In this case, the reference image is gradation-converted based upon the calculated value, and the resulting rough reference image can be given to the rough search section 6. Since the amount of memory required to store the calculated value is smaller than the amount of memory required to store the rough reference image itself, it becomes possible to reduce the amount of memory required for the positioning device. In this case, it is not necessary for the positioning device to calculate the feature of the reference image. In any of the arrangements, the same effects as the above-mentioned embodiments can be obtained as long as it has the arrangement in which the calculating section calculates the feature of the target image and the gradation conversion section carries out a gradation conversion based upon the results of calculations.

However, in the cases of the above-mentioned arrangements wherein the calculation section does not calculate the feature of the reference image, it is necessary for the positioning device to store the calculated value of the rough reference image or the rough reference image in an area that is separated from the area in which the reference image has been stored. Further, each time the reference image is altered, a time-consuming process is required to store the calculated feature or the rough reference image that has been gradation-converted in the positioning device.

Therefore, in the case when alternation to the reference image is expected, the calculating section is preferably arranged to also calculate the feature of the reference image and the gradation conversion section is preferably designed to also gradation-convert the reference image so as to generate rough reference image.

The first positioning device of the present invention is provided with: a maximum-value/minimum-value calculating section for calculating the maximum values and the minimum values of densities of the original images with respect to a preliminarily registered reference image and a target image that is newly inputted and that is to be positioned in relation to the reference image; a gradation conversion section (for example, a barrel-shifter gradation conversion circuit) which carries out bit shifts on the original images of the two images so as to allow them to contain effective bits related to contrast based upon the calculated maximum values and minimum values of densities, and gradation-converts the two images so as to have numbers of density levels that are fewer than the original numbers of density levels thereof, thereby outputting the resulting images that have been gradation-converted; a rough search section for finding the degree of similarity between the reference image and the target image based upon the output images after the gradation conversion so as to find a maximum matching candidate point; and a precise search section for finding a maximum matching point between the original images of the reference image and the target image in the proximity of the maximum matching candidate point.

With the above-mentioned arrangement, the maximum-value/minimum-value calculating section calculates the maximum value and minimum value of densities of the original image with respect to the reference image. Further, with respect to the target image that is to be positioned in relation to the reference image, the maximum-value/minimum-value calculating section calculates the maximum value and minimum value of densities of the original image.

Based upon the maximum value and minimum value of densities of the reference image thus calculated, the gradation conversion section carries out bit shifts on the original image of the reference image. Consequently, the original image of the reference image is gradation-converted so as to have the number of density levels that is fewer than the original number of density levels thereof, with the result that the output image after the gradation conversion is allowed to contain effective bits related to contrast among the bits of the original image of the reference image.

In the same manner, based upon the maximum value and minimum value of densities of the target image thus calculated, the gradation conversion section carries out bit shifts on the original image of the target image. Consequently, the original image of the target image is gradation-converted so as to have the number of density levels that is fewer than the original number of density levels thereof, with the result that the output image after the gradation conversion is allowed to contain effective bits related to contrast among the bits of the original image of the target image.

As described above, in any of the target image and the reference image, the output image after the gradation conversion is not simply compressed in its gradations, but is allowed to have lower gradations, and since the output image contains effective bits related to contrast, an effective rough search is available as described below. This occurs even in the case when the target image has poor contrast, such as in cases when the target image is dark and when it is bright as a whole with less change in densities.

Based upon the output images with lower gradations after the gradation conversion by the gradation conversion section, the rough search section finds the similarity between the reference image and the target image, and consequently finds the maximum matching candidate point. In this case, since the degree of similarity is found based upon the output images with lower gradations, the amount of calculations can be greatly reduced as compared with the case in which it is found based upon the original images; therefore, it is possible to reduce the circuit scale to the corresponding extent. Moreover, since the output images contain effective bits related to contrast, the accuracy of calculations for finding the degree of similarity in rough search is further improved; therefore, an effective rough search is available. In addition, since the bit shifter can be achieved by using a relatively simple circuit, it is possible to carry out an effective rough search without increasing the circuit scale of the entire positioning device so much.

In the proximity of the maximum matching candidate point found by the rough search section, the precision search section finds the maximum matching point between the two original images of the reference image and the target image, thereby carrying out positioning between the reference image and the target image.

In addition to the features of the invention of the first positioning device, the second positioning device of the present invention is further provided with an image-reducing section for reducing the resolutions of the output images after the gradation conversion.

With the above-mentioned arrangement, in addition to the functions of the first positioning device, the resolutions of the output images after the gradation conversion are reduced by the image-reducing section. Thus, by reducing the resolutions in this manner, the amount of calculations required for the rough search section to carry out a rough search is reduced to the corresponding extent.

Therefore, since the image-reducing section carries out reductions in the resolutions in addition to reduced gradations obtained by the gradation conversion section, the amount of calculations is greatly reduced, and therefore, it becomes possible to realize a rough search operation on a real-time basis by hardware.

In addition to the features of the invention of the first positioning device, the third positioning device of the present invention is further provided with an image-reducing section for reducing the resolutions of the original images of the above-mentioned two images before the gradation conversion.

With the above-mentioned arrangement, in addition to the functions of the first positioning device, the resolutions of the original images before the gradation conversion are reduced by the image-reducing section. Thus, by reducing the resolutions in this manner, the amount of calculations required for the rough search section to carry out a rough search is reduced to the corresponding extent.

Therefore, since the image-reducing section carries out reductions in the resolutions in addition to reduced gradations obtained by the gradation conversion section, the amount of calculations is greatly reduced, and therefore, it becomes possible to realize a rough search operation on a real-time basis by hardware.

The fourth positioning device of the present invention is provided with: a histogram-calculating section which calculates density histograms with respect to a reference image that has been preliminarily registered and a target image that is newly inputted and that is to be positioned in relation to the reference image; a gradation conversion section which, based upon the calculated density histograms, carries out respective histogram conversions (for example, histogram equalizing processes) so that effective density histograms related to contrast are contained, gradation-converts the two images so that they have fewer numbers of density levels than the original numbers of density levels, and releases the resulting converted images; a rough search section for finding the degree of similarity between the reference image and the target image based upon the output images after the gradation conversion so as to find a maximum matching candidate point; and a precise search section for finding a maximum matching point between the original images of the reference image and the target image in the proximity of the maximum matching candidate point.

With the above-mentioned arrangement, the histogram-calculating section calculates the density histograms of the original image with respect to the reference image. Further, with respect to the target image that is to be positioned in relation to the reference image, the histogram-calculating section calculates the density histograms of the original image.

Based upon the density histograms of the reference image thus calculated, the gradation conversion section carries out a histogram conversion on the original image of the reference image. Consequently, the original image of the reference image is gradation-converted so as to have the number of density levels that is fewer than the original number of density levels thereof, with the result that the output image after the gradation conversion is allowed to contain effective density histograms related to contrast among the density histograms of the original image of the reference image.

In the same manner, based upon the density histograms of the target image thus calculated, the gradation conversion section carries out a histogram conversion on the original image of the target image. Consequently, the original image of the target image is gradation-converted so as to have the number of density levels that is fewer than the original number of density levels thereof, with the result that the output image after the gradation conversion is allowed to contain effective density histograms related to contrast among the density histograms of the original image of the target image.

As described above, in any of the target image and the reference image, the output image after the gradation conversion is not simply compressed in its gradations, but is allowed to have lower gradations, and since the output image contains effective density histograms related to contrast, an effective rough search is available as described below, even in the case when the target image has poor contrast, such as in cases when the target image is dark and when it is bright as a whole with less change in densities.

Based upon the output images with lower gradations after the gradation conversion by the gradation conversion section, the rough search section finds the similarity between the reference image and the target image, and consequently finds the maximum matching candidate point. In this case, since the degree of similarity is found based upon the output images with lower gradations, the amount of calculations can be greatly reduced as compared with the case in which it is found based upon the original images; therefore, it is possible to reduce the circuit scale to the corresponding extent. Moreover, since the output images contain effective density histograms related to contrast so that the accuracy of calculations for finding the degree of similarity in rough search is further improved; therefore, an effective rough search is available.

Moreover, in the proximity of the maximum matching candidate point found by the rough search section, the precision search section finds the maximum matching point between the two original images of the reference image and the target image, thereby carrying out positioning between the reference image and the target image.

In addition to the features of the invention of the fourth positioning device, the fifth positioning device of the present invention is further provided with an image-reducing section for reducing the resolutions of the output images after the histogram conversion.

With the above-mentioned arrangement, in addition to the functions of the fourth positioning device, the resolutions of the output images after the histogram conversion are reduced by the image-reducing section. Thus, by reducing the resolutions in this manner, the amount of calculations required for the rough search section to carry out a rough search is reduced to the corresponding extent.

Therefore, since the image-reducing section carries out reductions in the resolutions in addition to reduced gradations obtained by the gradation conversion section, the amount of calculations is greatly reduced. Therefore, it becomes possible to realize a rough search operation on a real-time basis by hardware.

In addition to the features of the invention of the fourth positioning device, the sixth positioning device of the present invention is further provided with an image-reducing section for reducing the resolutions of the original images of the above-mentioned two images before the histogram conversion.

With the above-mentioned arrangement, in addition to the functions of the fourth positioning device, the resolutions of the original images before the histogram conversion are reduced by the image-reducing section. Thus, by reducing the resolutions in this manner, the amount of calculations required for the rough search section to carry out a rough search is reduced to the corresponding extent.

Therefore, since the image-reducing section carries out reductions in the resolutions in addition to reduced gradations obtained by the gradation conversion section, the amount of calculations is greatly reduced, and therefore, it becomes possible to realize a rough search operation on a real-time basis by hardware.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A positioning device, which carries out a positioning between a preliminarily registered reference image and a newly inputted target image, comprising:

a first calculating section for calculating features of the target image;

a first gradation conversion section which converts the gradation of the target image so as to produce a rough target image based upon the results of calculations in the first calculating section so that information related to contrast of the target image is contained to a greater extent, and so that the number of density levels of the target image is reduced;

a rough search section for finding the degree of similarity between a rough reference image whose gradation has been converted and the rough target image so as to find a maximum matching candidate point; and a precise search section for finding a maximum matching point between the reference image and the target image in the proximity of the maximum matching candidate point, wherein the first calculating section is a first maximum-value calculating section for calculating a maximum value of densities of the target image, and the first gradation conversion section generates the rough target image by linearly converting the density levels of the target image in a rate corresponding to the maximum value.

2. The positioning device as defined in claim 1, wherein the first gradation conversion section includes a bit shifter which generates the rough target image by carrying out bit shifts on the densities of the target image so that when the density level varies within a range not more than the maximum value, more bits in a binary number indicating the density levels are allowed to vary.

3. The positioning device as defined in claim 2, wherein the bit shifter carries out bit shifts so that when the density levels are expressed by a binary number, the bit, which is located one-bit lower than the lowest order bit among bits always having the same value within density levels that are not more than the maximum value, forms the highest order bit of the rough target image.

4. The positioning device as defined in claim 2, further comprising:

a first image-reducing section, placed between the first gradation conversion section and the rough search section, for reducing the resolution of the rough target image.

5. The positioning device as defined in claim 2, further comprising:

a first image-reducing section, placed before the first gradation conversion section, for reducing the resolution of the target image.

6. A positioning device, which carries out a positioning between a preliminarily registered reference image and a newly inputted target image, comprising:

a first calculating section for calculating features of the target image;

a first gradation conversion section which converts the gradation of the target image so as to produce a rough target image based upon the results of calculations in the first calculating section so that information related to contrast of the target image is contained to a greater extent, and so that the number of density levels of the target image is reduced;

a rough search section for finding the degree of similarity between a rough reference image whose gradation has been converted and the rough target image so as to find a maximum matching candidate point; and a precise search section for finding a maximum matching point between the reference image and the target image in the proximity of the maximum matching candidate point, wherein the first calculating section is a first minimum-value calculating section for calculating a minimum value of densities of the target image, and the first gradation conversion section generates the rough target image by linearly converting the density levels of the target image in a rate corresponding to the minimum value.

7. The positioning device as defined in claim 6, wherein the first gradation conversion section includes a bit shifter which generates the rough target image by carrying out bit shifts on the densities of the target image so that when the density level varies within a range not less than the minimum value, more bits in a binary number indicating the density levels are allowed to vary.

8. The positioning device as defined in claim 7, wherein the bit shifter carries out bit shifts so that when the density levels are expressed by a binary number, the bit, which is located one-bit lower than the lowest order bit among bits always having the same value within density levels that are not less than the minimum value, forms the highest order bit of the rough target image.

9. A positioning device, which carries out a positioning between a preliminarily registered reference image and a newly inputted target image, comprising:

a first calculating section for calculating features of the target image;

a first gradation conversion section which converts the gradation of the target image so as to produce a rough target image based upon the results of calculations in the first calculating section so that information related to contrast of the target image is contained to a greater extent, and so that the number of density levels of the target image is reduced;

a rough search section for finding the degree of similarity between a rough reference image whose gradation has been converted and the rough target image so as to find a maximum matching candidate point; and a precise search section for finding a maximum matching point between the reference image and the target image in the proximity of the maximum matching candidate point, wherein the first calculating section is a first maximum-value/minimum value calculating section for calculating a maximum value and a minimum value of densities of the target image, and the first gradation conversion section generates the rough target image by linearly converting the density levels of the target image in a rate corresponding to the maximum value and the minimum value.

10. The positioning device as set forth in claim 9, wherein the first gradation conversion section includes a bit shifter which generates the rough target image by carrying out bit shifts on the densities of the target image so that when the density level varies within a range from the minimum value to the maximum value, more bits in a binary number indicating the density levels are allowed to vary.

11. The positioning device as defined in claim 10, wherein the bit shifter carries out bit shifts so that when the density levels are expressed by a binary number, the higher order bit between the bit which is located one-bit lower than the lowest order bit among bits always having the same value within density levels that are not less than the minimum value and the bit which is located one-bit lower than the lowest order bit among bits always having the same value within density levels that are not more than the maximum value, forms the highest order bit of the rough target image.

12. A positioning device, which carries out a positioning between a preliminarily registered reference image and a newly inputted target image, comprising:

a first calculating section for calculating features of the target image;

a first gradation conversion section which converts the gradation of the target image so as to produce a rough target image based upon the results of calculations in the first calculating section so that information related to contrast of the target image is contained to a greater extent, and so that the number of density levels of the target image is reduced;

a rough search section for finding the degree of similarity between a rough reference image whose gradation has been converted and the rough target image so as to find a maximum matching candidate point; and a precise search section for finding a maximum matching point between the reference image and the target image in the proximity of the maximum matching candidate point, wherein the first calculating section detects bits whose value changes at least once all through the entire target image among a plurality of bits indicating the density levels, and the first gradation conversion section produces the rough target image by carrying out bit shifts on the densities of the target image so that the highest order bit among the bits whose value changes have been detected forms the highest order bit of the rough target image.

13. A positioning device, which carries out a positioning between a preliminarily registered reference image and a newly inputted target image, comprising:

a first calculating section for calculating features of the target image;

a first gradation conversion section which converts the gradation of the target image so as to produce a rough target image based upon the results of calculations in the first calculating section so that information related to contrast of the target image is contained to a greater extent, and so that the number of density levels of the target image is reduced;

a rough search section for finding the degree of similarity between a rough reference image whose gradation has been converted and the rough target image so as to find a maximum matching candidate point; and a precise search section for finding a maximum matching point between the reference image and the target image in the proximity of the maximum matching candidate point, wherein the first calculating section is a first histogram-calculating section for calculating density histograms of the target image, and based upon the density histograms, the first gradation conversion section generates the rough target image by carrying out a histogram-conversion so that effective density histograms related to contrast of the target image are contained.

14. The positioning device as defined in claim 13, wherein the first gradation conversion section carries out the histogram conversion so as to equalize the density histograms of the target image.

15. The positioning device as defined in claim 13, wherein the first gradation conversion section carries out the histogram conversion by means of parametric conversion.

16. A positioning device, which carries out a positioning between a preliminarily registered reference image and a newly inputted target image, comprising:

a first calculating section for calculating features of the target image;

a first gradation conversion section which converts the gradation of the target image so as to produce a rough target image based upon the results of calculations in the first calculating section so that information related to contrast of the target image is contained to a greater extent, and so that the number of density levels of the target image is reduced;

a rough search section for finding the degree of similarity between a rough reference image whose gradation has been converted and the rough target image so as to find a maximum matching candidate point; and a precise search section for finding a maximum matching point between the reference image and the target image in the proximity of the maximum matching candidate point further comprising;

a second calculating section for calculating features of the reference image, the features being the same as those calculated by the first calculating section; and a second gradation conversion section which converts the gradation of the reference image so as to produce the rough reference image based upon the results of calculations in the second calculating section so that information related to contrast of the reference image is contained to a greater extent, and so that the number of density levels of the reference image is reduced.

17. The positioning device as defined in claim 16, further comprising:

a second image-reducing section, placed between the second gradation conversion section and the rough search section, for reducing the resolution of the rough reference image.

18. The positioning device as defined in claim 16, further comprising:

a second image-reducing section, placed before the second gradation conversion section, for reducing the resolution of the reference image.

* * * * *